United States Patent
Sun et al.

(10) Patent No.: US 11,276,082 B1
(45) Date of Patent: Mar. 15, 2022

(54) METHODS AND SYSTEMS FOR MANAGING TRANSMISSION OF ELECTRONIC MARKETING COMMUNICATIONS

(71) Applicant: Groupon, Inc., Chicago, IL (US)

(72) Inventors: Shihua Sun, Sammamish, WA (US); James Violette, Issaquah, WA (US); Mahmoud Abdelwareth, Redmond, WA (US); Anthony Joseph, Bellevue, WA (US)

(73) Assignee: Groupon, Inc., Chicago, IL (US)

( * ) Notice: Subject to any disclaimer, the term of this patent is extended or adjusted under 35 U.S.C. 154(b) by 952 days.

(21) Appl. No.: 14/983,838

(22) Filed: Dec. 30, 2015

Related U.S. Application Data

(60) Provisional application No. 62/098,987, filed on Dec. 31, 2014.

(51) Int. Cl.
| | |
|---|---|
| *G06Q 30/02* | (2012.01) |
| *H04L 12/58* | (2006.01) |
| *G06Q 10/06* | (2012.01) |
| *H04L 51/222* | (2022.01) |
| *H04L 51/00* | (2022.01) |

(52) U.S. Cl.
CPC ....... *G06Q 30/0264* (2013.01); *G06Q 10/067* (2013.01); *G06Q 30/0246* (2013.01); *G06Q 30/0249* (2013.01); *H04L 51/14* (2013.01); *H04L 51/20* (2013.01)

(58) Field of Classification Search
CPC .................................. G06Q 30/0207–30/0277
USPC .................................................. 705/14, 319
See application file for complete search history.

(56) References Cited

U.S. PATENT DOCUMENTS

| | | | |
|---|---|---|---|
| 2012/0120254 A1* | 5/2012 | Tan | H04N 21/23805 348/184 |
| 2013/0215784 A1* | 8/2013 | Nordstrom | H04W 72/085 370/252 |
| 2013/0304826 A1* | 11/2013 | Li | H04L 51/14 709/206 |
| 2015/0046279 A1* | 2/2015 | Wang | G06F 3/0482 705/26.3 |
| 2016/0019608 A1* | 1/2016 | Smith | G06F 3/0611 705/346 |

* cited by examiner

*Primary Examiner* — Waseem Ashraf
*Assistant Examiner* — Richard G Reinhardt
(74) *Attorney, Agent, or Firm* — Alston & Bird LLP

(57) ABSTRACT

Systems, methods, and computer readable storage media for controlling the transmission of electronic messages are provided. Aspects of the disclosure provide a method for controlling electronic transmission of electronic communications generated by authoring services. The method includes receiving a first message from a first authoring service of the plurality of authoring services, the first message comprising at least one recipient and content for at least one electronic communication, adding the first message to a message queue associated with the at least one recipient, determining one or more characteristics associated with the at least one recipient, evaluating the first message using the one or more characteristics to determine a first message state for the first message, in response to determining that the message state indicates the first message is to be transmitted, forwarding the first message to message transmission circuitry, and transmitting the first message to the recipient.

18 Claims, 11 Drawing Sheets

METHODS AND SYSTEMS FOR MANAGING TRANSMISSION OF ELECTRONIC MARKETING COMMUNICATIONS

CROSS REFERENCE TO RELATED APPLICATIONS

This application claims the benefit of U.S. Provisional Application No. 62/098,987, filed Dec. 31, 2014, which is incorporated by reference herein in its entirety.

TECHNOLOGICAL FIELD

Example embodiments of the present invention relate generally to transmitting electronic marketing communications and, more particularly, to methods, systems, and apparatuses for assessing the quality of and managing the frequency of electronic marketing communications.

BACKGROUND

The applicant has discovered problems with current methods, systems, and apparatuses for evaluating and transmitting electronic marketing communications. Through applied effort, ingenuity, and innovation, Applicant has solved many of these identified problems by developing a solution that is embodied by the present invention, which is described in detail below.

BRIEF SUMMARY

Accordingly, a method, apparatus, and computer program manage the transmission of electronic marketing communications. Example embodiments may include methods, systems, apparatuses, and the like that provide a management interface between message authors and a message transmission service to ensure that message recipients receive messages according to a defined, predictable, and/or derived schedule. For example, embodiments include a coordination service that manages transmission of messages according to a schedule and message queue for particular user recipients. Embodiments may include a user preference model for one or more users that controls whether particular messages are accepted for transmission to individual users. Embodiments may further provide additional experimental capabilities that allow for modification to transmission schedules and monitoring of the results of the modifications to improve the manner in which future messages are transmitted to recipients.

Embodiments may include a method for controlling electronic transmission of electronic marketing communications generated by a plurality of authoring services. The method includes receiving, from message authoring circuitry, a first message from a first authoring service of the plurality of authoring services. The first message includes at least one recipient and content for at least one electronic marketing communication. The method also includes adding, by message management circuitry, the first message to a message queue associated with the at least one recipient, determining, by the message management circuitry, one or more characteristics associated with the at least one recipient, evaluating the first message, by the message management circuitry, using the one or more characteristics to determine a first message state for the first message, in response to determining that the message state indicates the first message is to be transmitted, forwarding, by the message management circuitry, the first message to message transmission circuitry, and transmitting, by the message transmission circuitry, the first message to the recipient.

Embodiments of the method may also include determining, by the message management circuitry, a message budget for the first authoring service, providing the message budget to the first authoring service, and receiving the first message from the first authoring service in response to providing the message budget to the first authoring service. The first authoring service may selects the first message based at least in part on the message budget. The method may also include determining a budget value for the first message, and reducing the message budget in response to transmitting the first message. In some embodiments the method includes receiving, by the message management circuitry, a registration request from the first authoring service, wherein the message budget is determined in response to receiving the registration request. The method may also include receiving a second message from a second authoring service of the plurality of authoring services, adding, by the message management circuitry, the second message to the message queue, evaluating the second message, by the message management circuitry, using the one or more characteristics to determine a second message state for the second message, and, in response to determining that the message state indicates the second message is to be discarded, removing the second message from the message queue without transmitting the second message. The one or more characteristics may include a recipient preference model. The method may include monitoring, by the message management circuitry, one or more metrics associated with the first message, and updating the recipient preference model based at least in part on the one or more metrics. The method may include adjusting at least one variable related to the evaluation of the first message by the message management circuitry, identifying a correlation between the one or more metrics and the at least one variable, and modifying a subsequent message evaluation process based at least in part on the correlation. The one or more metrics may indicate where the first message generated at least one of an impression or a purchase.

The method may include locking the message queue to prevent access by another operation during adding the first message to the message queue, evaluating the first message, and transmitting the first message. The method may also include receiving a plurality of messages from the plurality of authoring services, adding the plurality of messages to the message queue, evaluating each of the plurality of messages to the message queue, and assigning a message state to each of the plurality of messages based on evaluating the messages, wherein at least one of the message states indicates a message was accepted. The method may also include receiving a preemptive message after assigning the message state to each of the plurality of messages, in response to receiving the preemptive message, reevaluating the plurality of messages in the message queue and evaluating the preemptive message, based on the reevaluation of the plurality of messages, altering the at least one of the message states to reject the message that was accepted, assigning a state of the preemptive message to accepted, and, transmitting the preemptive message by the message transmission circuitry.

Embodiments of the method may also include receiving a message transmission buffer status from the message transmission circuitry, and approving a plurality of messages for transmission by the message transmission circuitry at a rate based on the message transmission buffer status. Approving the plurality of messages for transmission by the message transmission circuitry at the rate based on the message transmission buffer status may include determining a difference between an approval time at which an approved message is approved by the message management circuitry and a time at which the message transmission circuitry is expected to transmit the message to the recipient, and ensuring that the difference is below a minimum threshold before approving at least one of the plurality of messages for transmission by the message transmission circuitry. The minimum threshold may be a value that is configurable by the message management circuitry.

Embodiments also include a non-transitory computer readable storage medium comprising instructions that, when executed, configure an apparatus to control electronic transmission of electronic marketing communications generated by a plurality of authoring services. The instructions include program instructions for receiving a first message from a first authoring service of the plurality of authoring services, the first message comprising at least one recipient and content for at least one electronic marketing communication, program instructions for adding the first message to a message queue associated with the at least one recipient, program instructions for determining one or more characteristics associated with the at least one recipient, program instructions for evaluating the first message using the one or more characteristics to determine a first message state for the first message, program instructions for, in response to determining that the message state indicates the first message is to be transmitted, forwarding the first message to message transmission circuitry, and program instructions for transmitting the first message to the recipient.

Embodiments may include an apparatus for controlling electronic transmission of electronic marketing communications generated by a plurality of authoring services. The apparatus includes means for receiving a first message from a first authoring service of the plurality of authoring services, the first message comprising at least one recipient and content for at least one electronic marketing communication, means for adding the first message to a message queue associated with the at least one recipient, means for determining one or more characteristics associated with the at least one recipient, means for evaluating the first message using the one or more characteristics to determine a first message state for the first message, means for, in response to determining that the message state indicates the first message is to be transmitted, forwarding the first message to message transmission circuitry, and means for transmitting the first message to the recipient.

Embodiments may include yet another apparatus for controlling electronic transmission of electronic marketing communications generated by a plurality of authoring services. The apparatus includes message management circuitry configured to receive, from message authoring circuitry, a first message from a first authoring service of the plurality of authoring services, the first message comprising at least one recipient and content for at least one electronic marketing communication, add the first message to a message queue associated with the at least one recipient, determine one or more characteristics associated with the at least one recipient, evaluate the first message using the one or more characteristics to determine a first message state for the first message, and, in response to determining that the message state indicates the first message is to be transmitted, forward the first message to message transmission circuitry. The apparatus also includes message transmission circuitry configured to transmit the first message to the recipient. In some embodiments, the apparatus also includes the message authoring circuitry.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
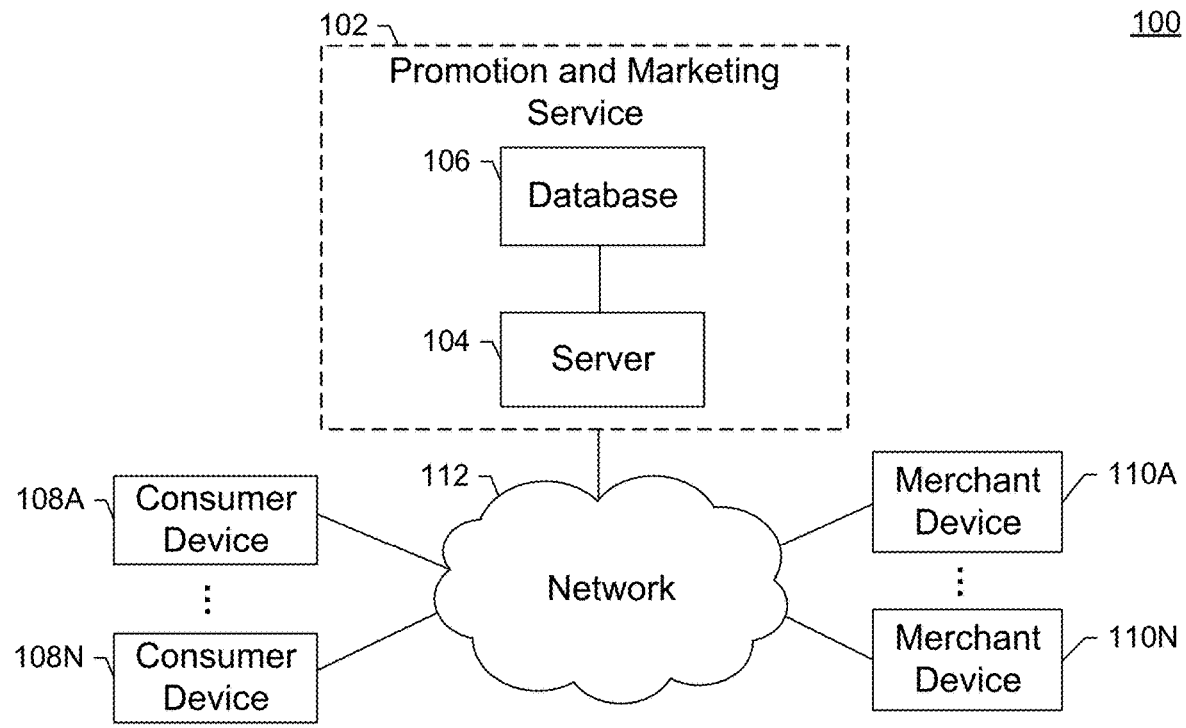
Figure 2:
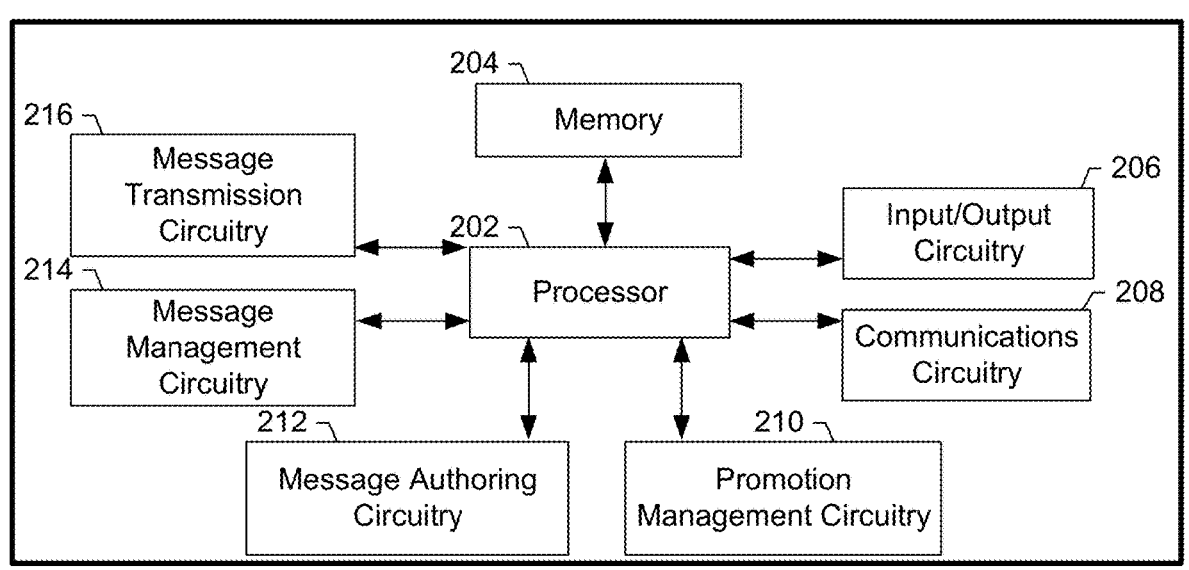
Figure 3:
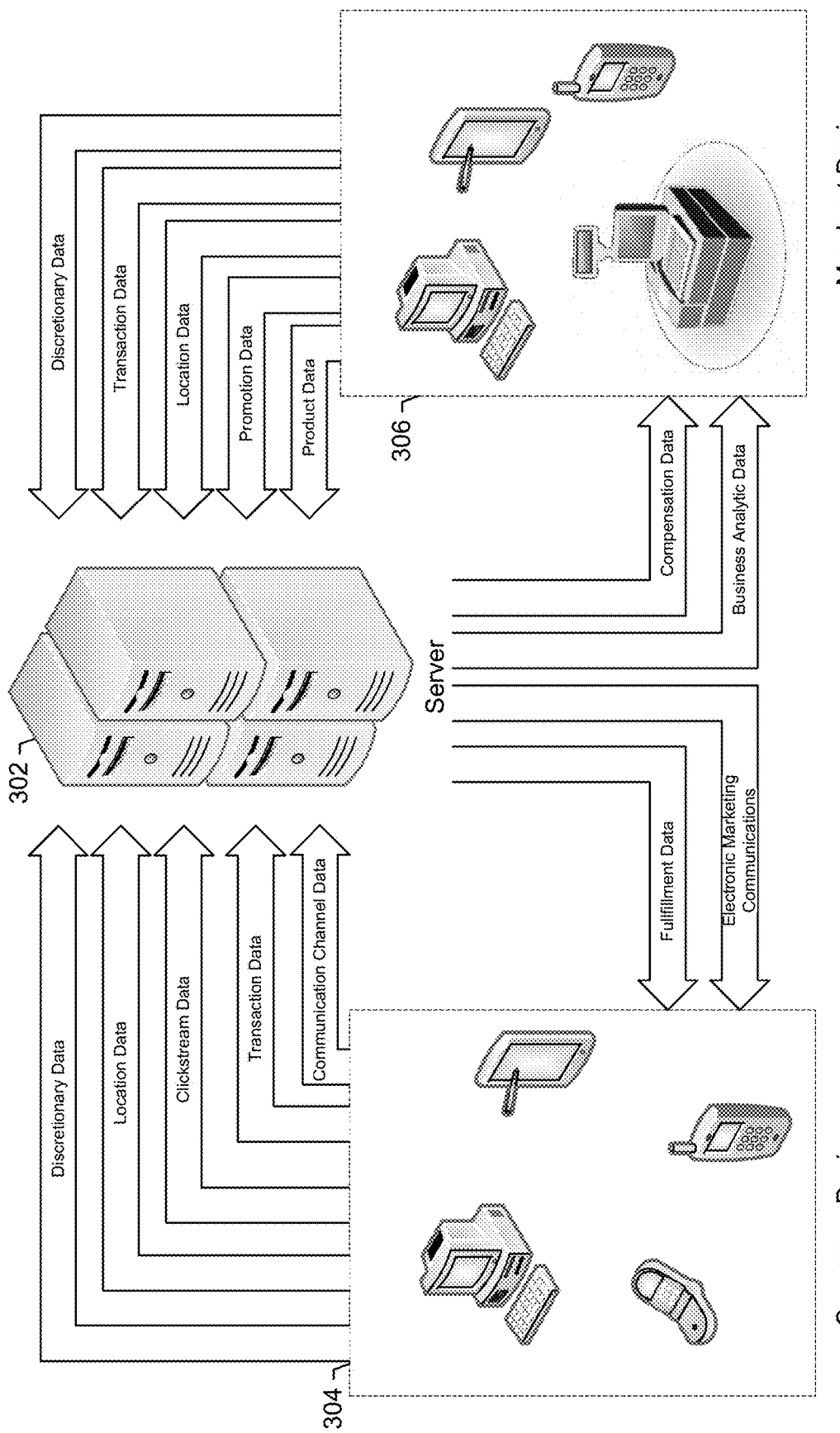
Figure 4:
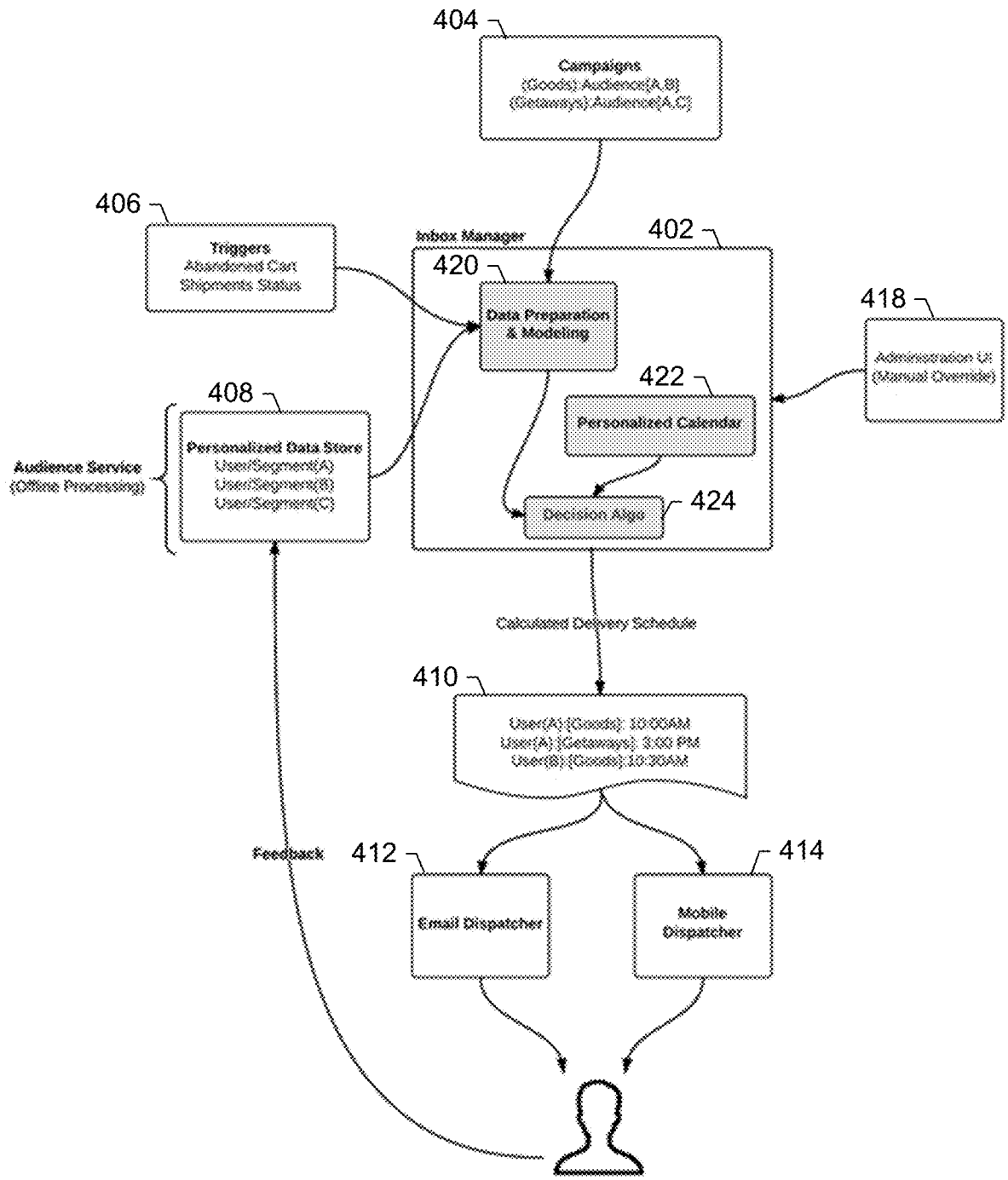
Figure 5:
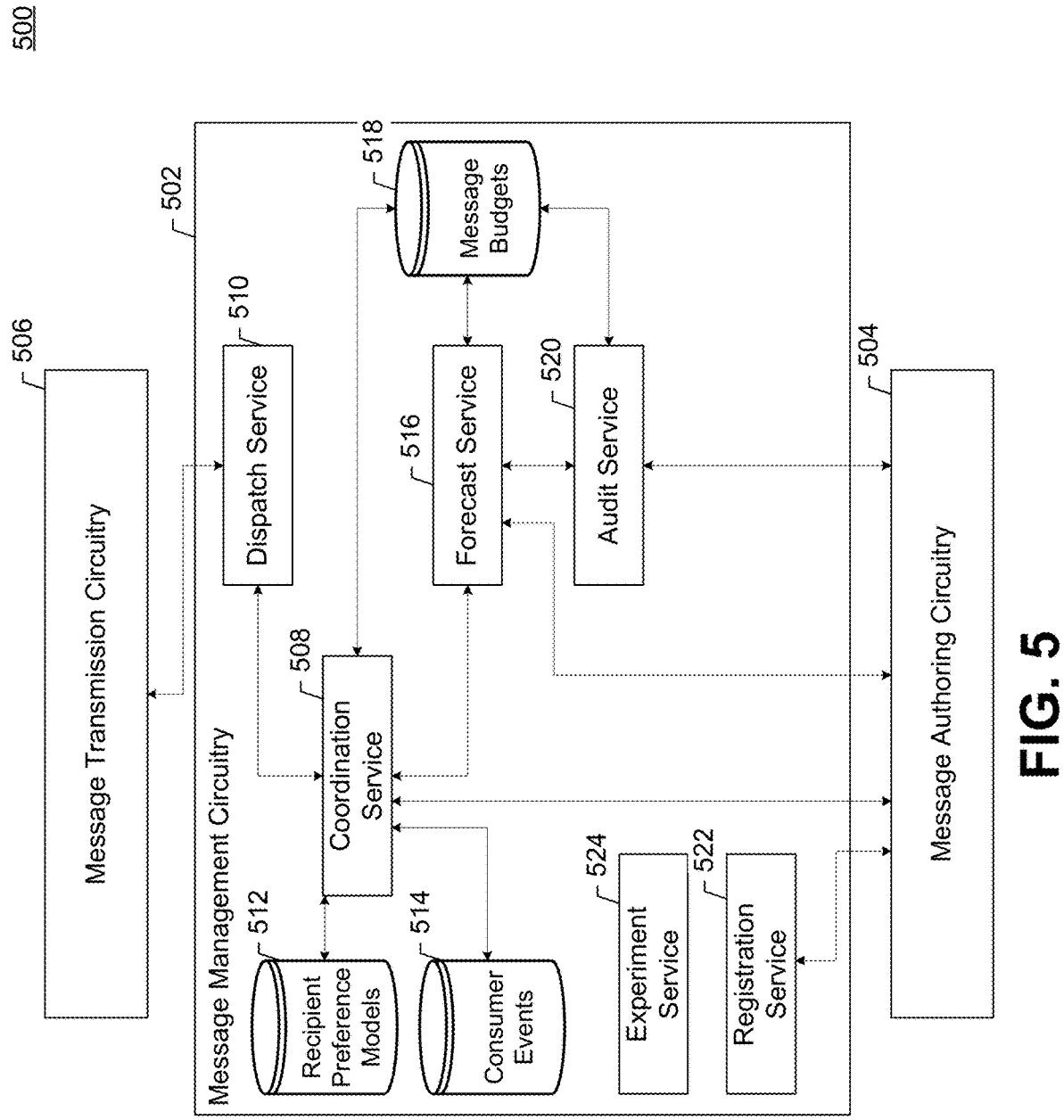
Figure 6:
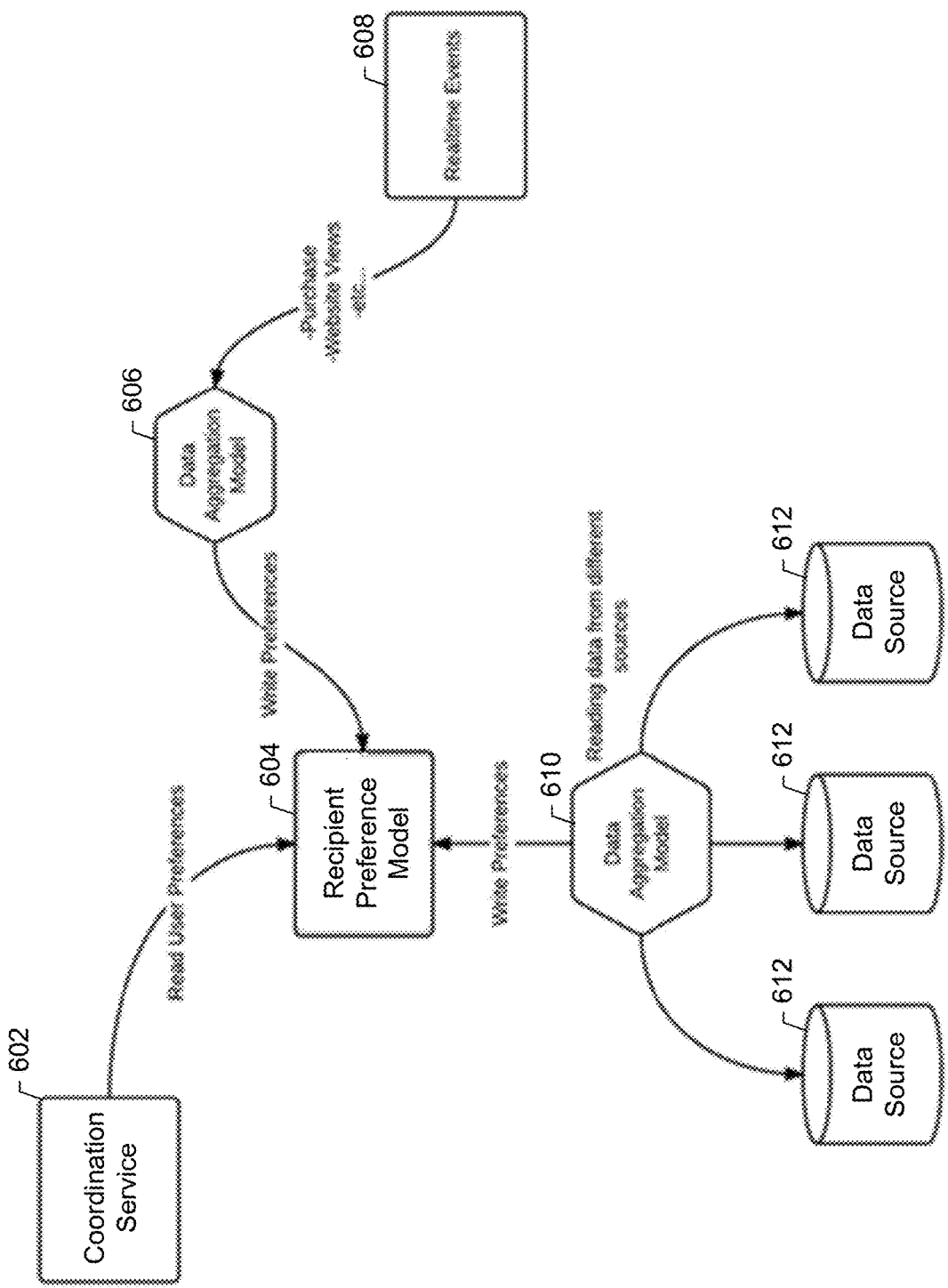
Figure 7:
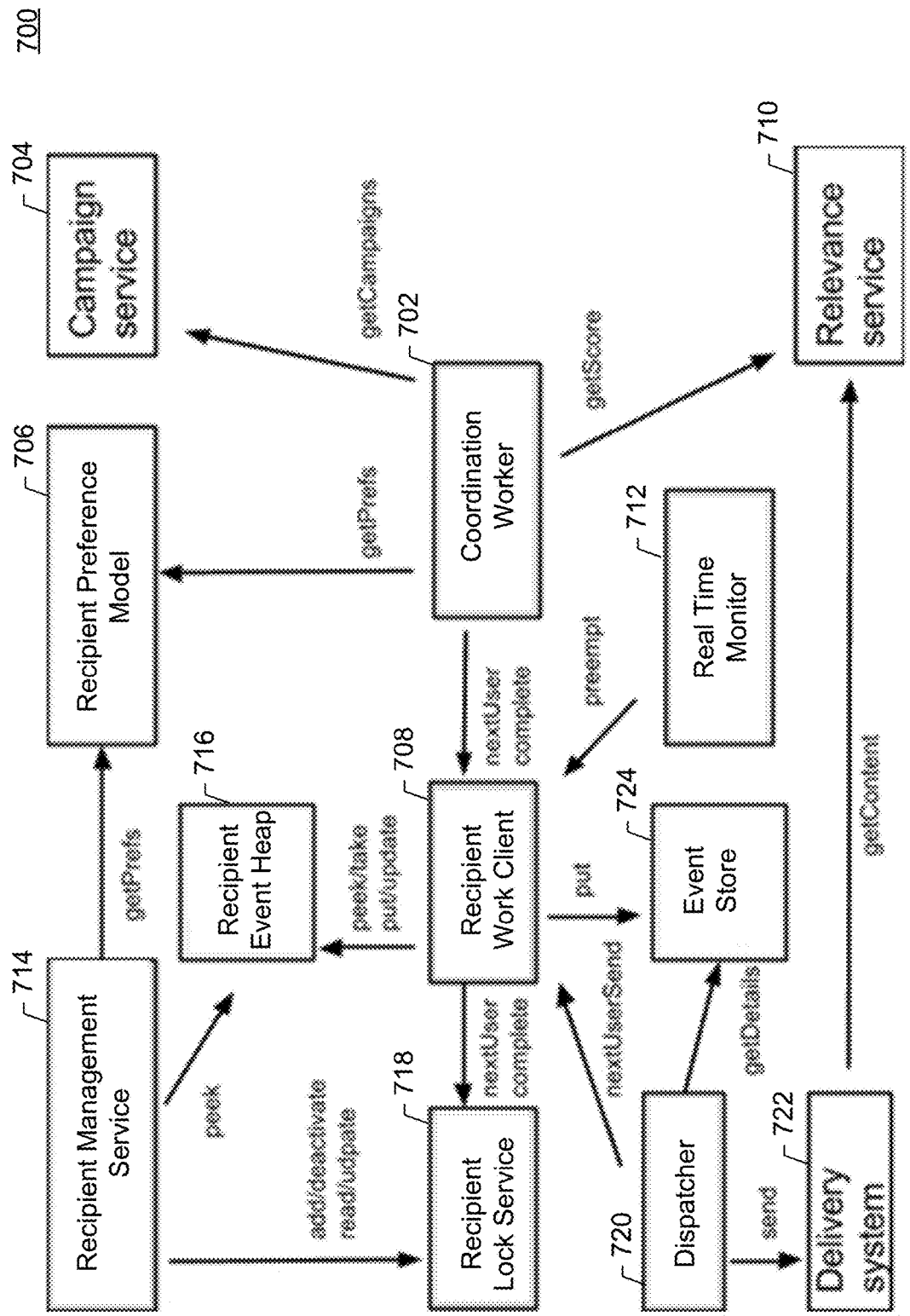
Figure 8:
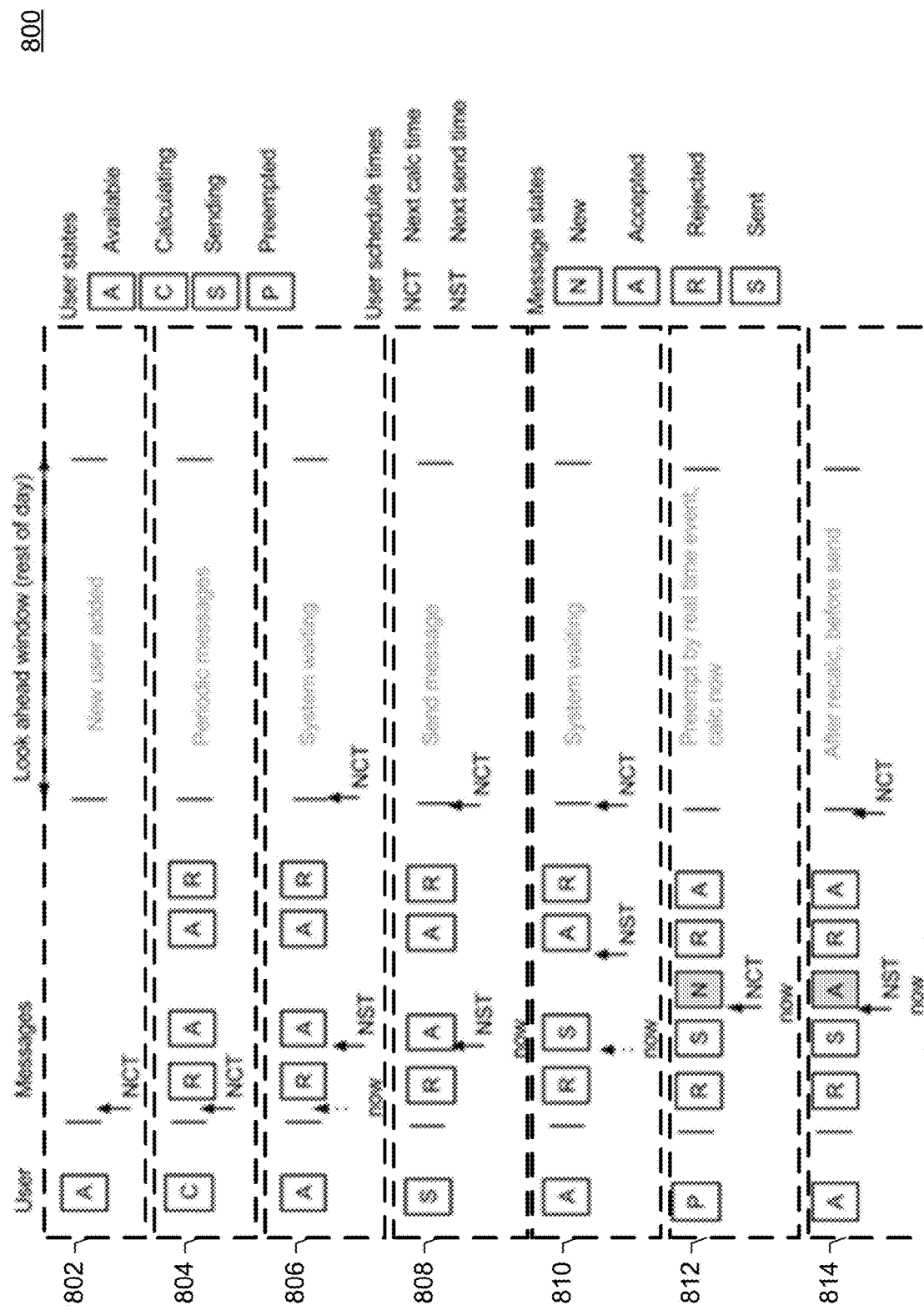
Figure 9:
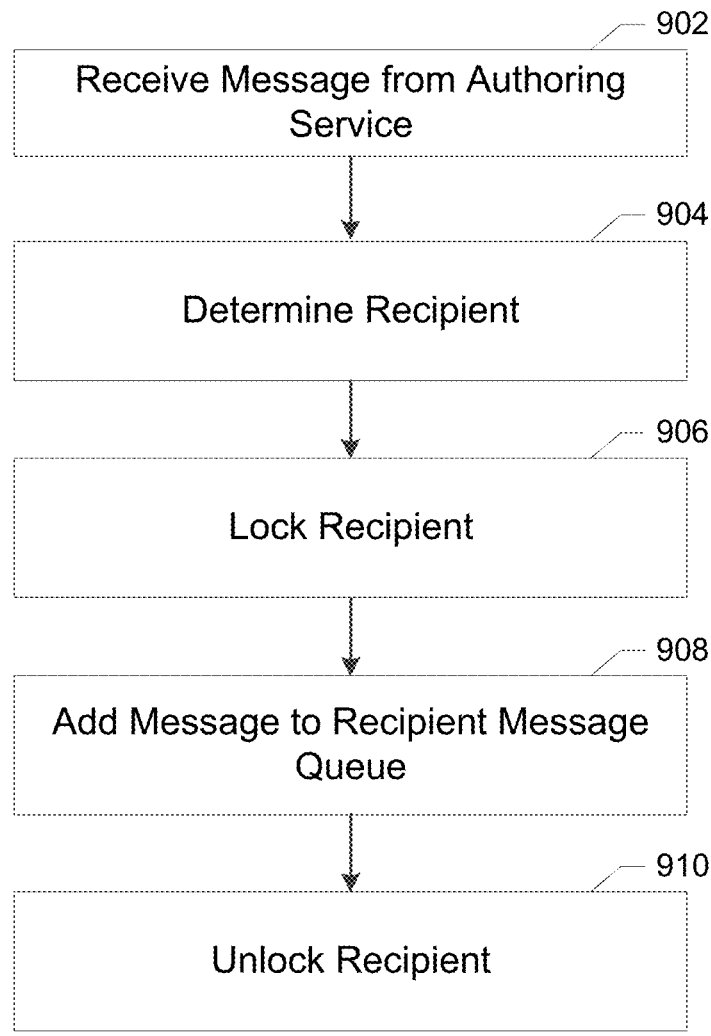
Figure 10:
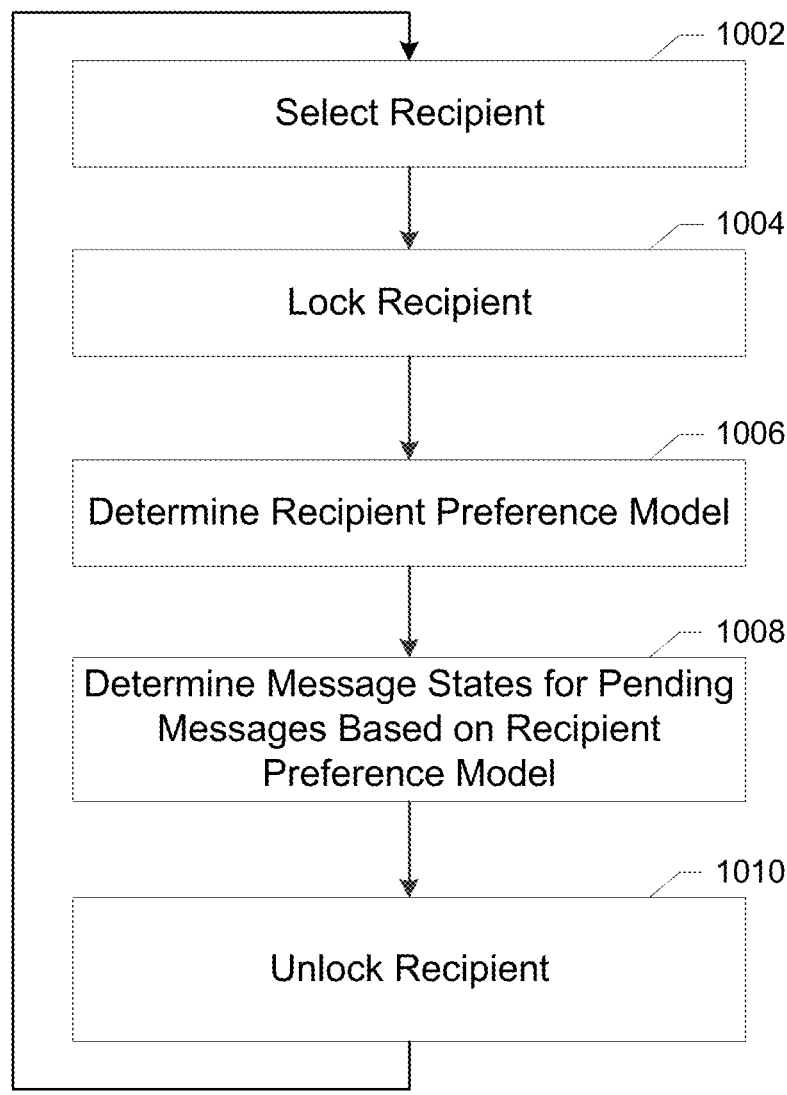
Figure 11:
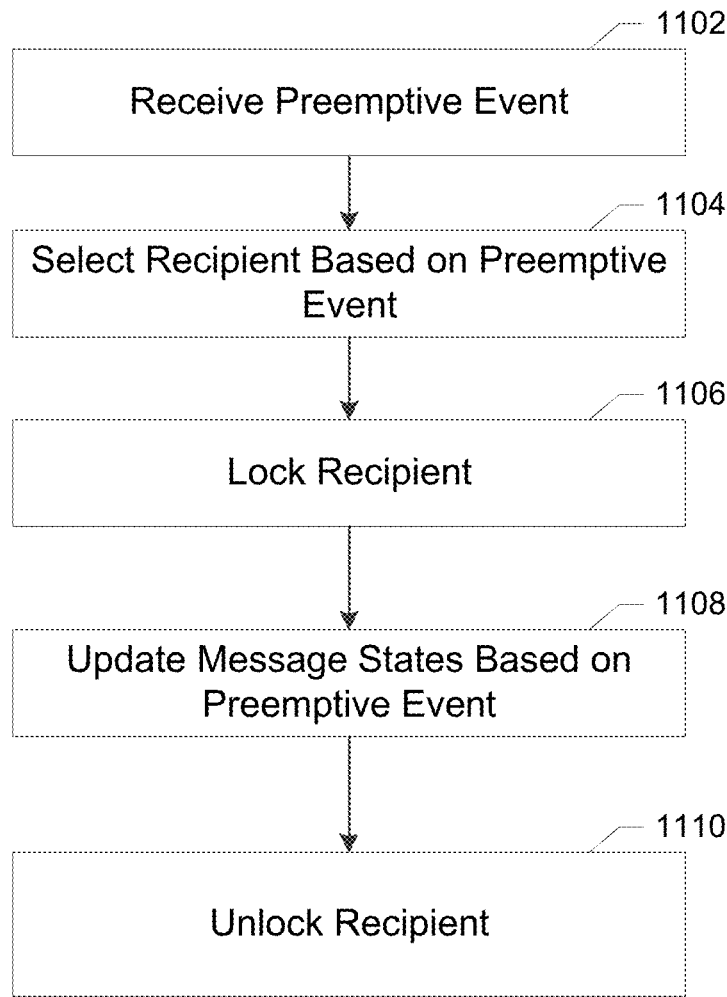
Figure 12:
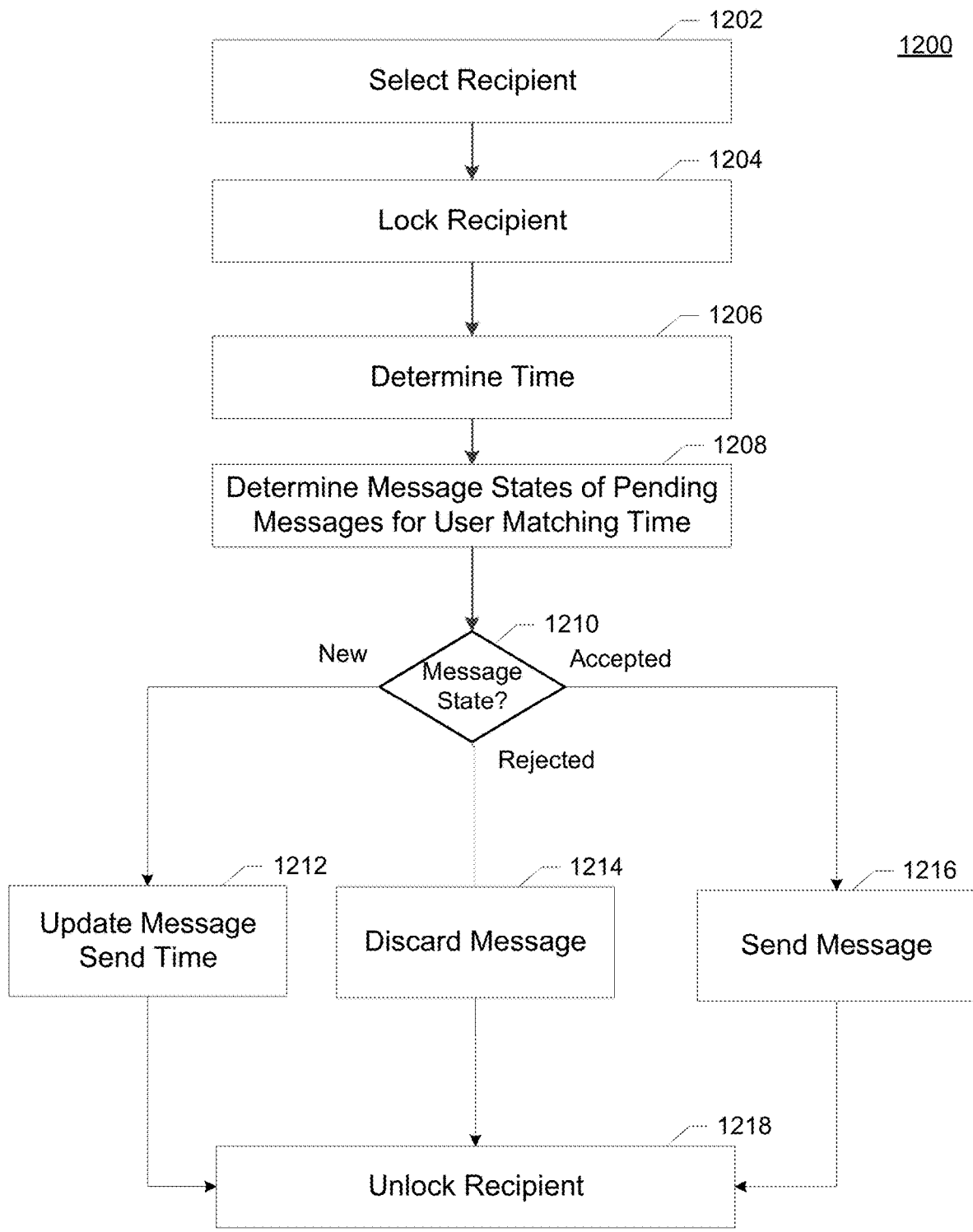

Having thus described certain example embodiments of the present disclosure in general terms, reference will now be made to the accompanying drawings, which are not necessarily drawn to scale, and wherein:

FIG. 1 illustrates an example system within which embodiments of the present invention may operate;

FIG. 2 illustrates a block diagram showing an example device for implementing a message management system using special-purpose circuitry in accordance with some exemplary embodiments of the present invention;

FIG. 3 illustrates an example data flow among a consumer device, a server, and a merchant device in accordance with some exemplary embodiments of the present invention;

FIG. 4 illustrates an example data flow interaction depicting inputs and outputs among components of a system implementing a message management system in accordance with some exemplary embodiments of the present invention;

FIG. 5 illustrates an example data flow interaction among components of a system implementing a message management system in accordance with some exemplary embodiments of the present invention;

FIG. 6 illustrates an example data flow interaction for building a user preference model for use by a message management system in accordance with some exemplary embodiments of the present invention;

FIG. 7 illustrates example object relationships among components of a message management system in accordance with some exemplary embodiments of the present invention;

FIG. 8 illustrates an example of a message queue for transmitting messages using a message management system in accordance with some exemplary embodiments of the present invention;

FIG. 9 illustrates a flow diagram depicting an example of a method for associating a message with a user message queue in accordance with some exemplary embodiments of the present invention;

FIG. 10 illustrates a flow diagram depicting an example of a method for calculating a message state for one or more messages in a user message queue in accordance with some exemplary embodiments of the present invention;

FIG. 11 illustrates a flow diagram depicting an example of a method for implementing a message preemption system in response to a preemptive event in accordance with some exemplary embodiments of the present invention; and FIG. 12 illustrates a flow diagram depicting an example of a method for transmitting a message using a message management system in accordance with some exemplary embodiments of the present invention.

DETAILED DESCRIPTION

Overview

Various embodiments of the present invention are directed to improved apparatuses, methods, and computer readable media for identifying trending promotions for inclusion in electronic marketing communications. In this regard, embodiments of the present invention provide systems, devices, and frameworks for managing the transmission of electronic marketing communications to ensure a proper frequency of transmissions across a plurality of message authors. Embodiments may thus function as an "advocate" for message recipients to ensure that recipients receive messages at a desirable frequency such that recipients are not inundated by messages from multiple message authors. Embodiments may therefore serve as an intermediary layer that manages outgoing messages from multiple message authors, such that messages are not transmitted to a recipient without approval by the message management system.

Embodiments may implement individual message queues for individual message recipients, such that each recipient has a separate message queue. Alternatively, some embodiments may implement group queues, such as queues associated with a plurality of recipients. When a new message is created by a message author, the message may be added to a queue associated with the recipient. Messages in the queue may be periodically evaluated during a calculation process. The evaluation process may result in a given message being approved/accepted or denied/rejected. Accepted messages may be transmitted during a next transmission interval, and rejected messages may be discarded, or otherwise prevented from transmission. In some embodiments, rejected messages may be reevaluated at a later time, such that messages are only discarded after an associated send window has expired. For example, a rejected message may be later accepted if a preemptive event alters the result of a previous calculation.

Adjustment to messages within a queue may be managed by a permissions system that prevents multiple actions from occurring with respect to the same user at a single time. For example, adding a message to a queue, calculating a message status, and sending a message may each require locking a data structure associated with the queue such that multiple actions are not performed simultaneously in a manner that may inadvertently skip a message or erroneously transmit a message. Message queues may also be employed to manage the rate at which messages are sent to "downstream" transmission services and to decide which recipients receive precedence and preference over other recipients based on available capacity. For example, if a message transmission system has a fixed rate, embodiments of the recipient message queues may be implemented such that high value recipients and/or high value electronic marketing communications receive preference in a send buffer for outgoing messages. In another example, embodiments may ensure that recipients with recent activity receive priority for outgoing communications over dormant recipients by selection of which message queues are processed in and in which order.

Embodiments may also include a mechanism for preemption of normal message queue operations. Changing circumstances and real-time data updates may result in a need to change a status of an outgoing message. For example, an incoming data signal that indicates a message should be transmitted to a consumer at a high priority (e.g., a location signal that indicates a consumer is at a merchant offering a promotion) may be used to preempt normal queue operation and insert messages in the queue. Upon insertion of a message in the queue, other messages may be reevaluated for transmission. For example, upon insertion of the high priority message, another normally scheduled message may be discarded or rescheduled for a later time.

Embodiments may also utilize the capabilities of a transmission system to manage approval/rejection of outgoing messages. For example, if a throughput of a transmission service is less than the throughput of message authoring services, the message management system may manage approval of outgoing messages to ensure the transmission system is not overloaded. In some embodiments, the message management system may operate at less than the maximum throughput of the transmission system in order to maintain a time buffer to allow for alteration or addition of messages to the send buffer, such as in the case of preemptive messages.

Embodiments may also include an experimental service that provides a "closed loop" system that improves the process by which messages are approved or denied for transmission to recipients. An experimental service may alter the frequency with which messages are approved for transmission to particular user based on certain factors, such as the relevance of the message to the recipient, the time of day, the type of message (e.g., mobile app notification, social network post, or email), or the like. The experimental service may monitor changes in recipient behavior and identify correlations between recipient behavior and particular alterations implemented by the experimental service. In this manner, embodiments implementing an experimental service may improve the process by which messages are authorized to be sent to recipients.

Definitions

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from consumers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "consumer" should be understood to refer to a recipient of goods, services, promotions, media, or the like provided by the promotion and marketing service and/or a merchant. Consumers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a consumer, known as an "accepted value." When redeemed, the promotion may be used to purchase a "promotional value" representing the retail price of the goods. The promotion may also have a "residual value," reflecting the remaining value of the promotion after expiration. Although consumers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a consumer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the consumer. The consumer would then be able to redeem the promotion at the restaurant for $50 applied toward their meal check. This $50 would be the promotional value of the promotion. If the consumer did not use the promotion before expiration, the consumer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the consumer, and the like. For example, the return on investment value might be $10.00, reflecting the long term additional profit expected by the merchant as a result of bringing in a new customer through use of a promotion.

Promotions may be provided to consumers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "redemption" refers to the use, exchange or other presentation of an instrument for at least a portion of a good, service or experience as defined by the instrument and its related promotion. In some examples, redemption includes the verification of validity of the instrument. In other example embodiments, redemption may include an indication that a particular instrument has been redeemed and thus no longer retains an actual, promotional and/or residual value (e.g., full redemption). In other example embodiments, redemption may include the redemption of at least a portion of its actual, promotional and/or residual value (e.g., partial redemption). An example of redemption, using the aforementioned restaurant as the example provider, is the exchange of the $50 instrument and $50 to settle a $100 meal check.

As used herein, the term "impression" refers to a metric for measuring how frequently consumers are provided with marketing information related to a particular good, service, or promotion. Impressions may be measured in various different manners, including, but not limited to, measuring the frequency with which content is served to a consumer (e.g., the number of times images, websites, or the like are requested by consumers), measuring the frequency with which electronic marketing communications including particular content are sent to consumers (e.g., a number of e-mails sent to consumers or number of e-mails including particular promotion content), measuring the frequency with which electronic marketing communications are received by consumers (e.g., a number of times a particular e-mail is read), or the like. Impressions may be provided through various forms of media, including but not limited to communications, displays, or other perceived indications, such as e-mails, text messages, application alerts, mobile applications, other type of electronic interface or distribution channel and/or the like, of one or more promotions.

As used herein, the term "electronic marketing information" refers to various electronic data and signals that may be interpreted by a promotion and marketing service to provide improved electronic marketing communications. Electronic marketing information may include, without limitation, clickstream data (defined below), transaction data (defined below), location data (defined below), communication channel data (defined below), discretionary data (defined below), or any other data stored by or received by the promotion and marketing service for use in providing electronic communications to consumers.

As used herein, the term "clickstream data" refers to electronic information indicating content viewed, accessed, edited, or retrieved by consumers. This information may be electronically processed and analyzed by a promotion and marketing service to improve the quality of electronic marketing and commerce transactions offered by, through, and in conjunction with the promotion and marketing service. It should be understood that the term "clickstream" is not intended to be limited to mouse clicks. For example, the clickstream data may include various other consumer interactions, including without limitation, mouse-over events and durations, the amount of time spent by the consumer viewing particular content, the rate at which impressions of particular content result in sales associated with that content, demographic information associated with each particular consumer, data indicating other content accessed by the consumer (e.g., browser cookie data), the time or date on which content was accessed, the frequency of impressions for particular content, associations between particular consumers or consumer demographics and particular impressions, and/or the like.

As used herein, the term "transaction data" refers to electronic information indicating that a transaction is occurring or has occurred via either a merchant or the promotion and marketing service. Transaction data may also include information relating to the transaction. For example, transaction data may include consumer payment or billing information, consumer shipping information, items purchased by the consumer, a merchant rewards account number associated with the consumer, the type of shipping selected by the consumer for fulfillment of the transaction, or the like.

As used herein, the term "location data" refers to electronic information indicating a particular location. Location data may be associated with a consumer, a merchant, or any other entity capable of interaction with the promotion and marketing service. For example, in some embodiments location data is provided by a location services module of a consumer mobile device. In some embodiments, location data may be provided by a merchant indicating the location of consumers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

As used herein, the term "communication channel data" refers to electronic information relating to the particular device or communication channel upon which a merchant or consumer communicates with the promotion and marketing service. In this regard, communication channel data may include the type of device used by the consumer or merchant (e.g., smart phone, desktop computer, laptop, netbook, tablet computer), the Internet Protocol (IP) address of the device, the available bandwidth of a connection, login credentials used to access the channel (e.g., a user account and/or password for accessing the promotion and marketing service), or any other data pertaining to the communication channel between the promotion and marketing service and an entity external to the promotion and marketing service.

As used herein, the term "discretionary data" refers to electronic information provided by a merchant or consumer explicitly to the promotion and marketing service in support of improved interaction with the promotion and marketing service. Upon registering with the promotion and marketing service or at any time thereafter, the consumer or merchant may be invited to provide information that aids the promotion and marketing service in providing services that are targeted to the particular needs of the consumer or merchant. For example, a consumer may indicate interests, hobbies, their age, gender, or location when creating a new account. A merchant may indicate the type of goods or services provided, their retail storefront location, contact information, hours of operation, or the like.

It should be appreciated that the term "discretionary data" is intended to refer to information voluntarily and explicitly provided to the promotion and marketing service, such as by completing a form or survey on a website or application hosted by the promotion and marketing service. However, is should be appreciated that the examples of discretionary data provided above may also be determined implicitly or through review or analysis of other electronic marketing information provided to the promotion and marketing service. It should also be appreciated that the promotion and marketing service may also gate access to certain features or tools based on whether certain discretionary data has been provided. For example, the consumer may be required to provide information relating to their interests or location during a registration process.

As used herein, the term "offering parameters" refers to terms and conditions under which the promotion is offered by a promotion and marketing service to consumers. These offering parameters may include parameters, bounds, considerations and/or the like that outline or otherwise define the terms, timing, constraints, limitations, rules or the like under which the promotion is sold, offered, marketed, or otherwise provided to consumers. Example offering parameters include, using the aforementioned restaurant as the example provider, limit one instrument per person, total of 100 instruments to be issued, a run duration of when the promotion will be marketed via the promotion and marketing service, and parameters for identifying consumers to be offered the promotion (e.g., factors influencing how consumer locations are used to offer a promotion).

As used herein, the term "redemption parameters" refers to terms and conditions for redeeming or otherwise obtaining the benefit of promotions obtained from a promotion and marketing service. The redemption parameters may include parameters, bounds, considerations and/or the like that outline the term, timing, constraints, limitations, rules or the like for how and/or when an instrument may be redeemed. For example, the redemption parameters may include an indication that the instrument must be redeemed prior to a specified deadline, for a specific good, service or experience and/or the like. For example, using the aforementioned restaurant as the example provider, the redemption parameters may specify a limit of one instrument per visit, that the promotion must be used in store only, or that the promotion must be used by a certain date.

As used herein, the term "promotion content" refers to display factors or features that influence how the promotion is displayed to consumers. For example, promotion content may include an image associated with the promotion, a narrative description of the promotion or the merchant, a display template for association with the promotion, or the like. For example, merchant self-service indicators (defined below) may be used to identify promotion offers that were generated by merchants with similar characteristics to the merchant self-service indicators. Various other factors may be used to generate the promotion offer, such as the success of the promotion offers generated by the merchants with similar characteristics, the product availability of the merchant, and the like.

As used herein, the term "promotion component" is used to refer to elements of a particular promotion that may be selected during a promotion generation process. Promotion components may include any aspect of a promotion, including but not necessarily limited to offering parameters, redemption parameters, and promotion content. For example, promotion components may include, but are not limited to, promotion titles, promotion ledes (e.g., a short text phrase displayed under a promotion title), promotion images, promotion prices, promotion discount levels, promotion style sheets, promotion fonts, promotion e-mail subjects, promotion quantities, promotion fine print options, promotion fees assessed to the merchant by the promotion and marketing service, or the like. Promotion components may also include various flags and settings associated with registration and verification functions for a merchant offering the promotion, such as whether the identity of the merchant has been verified, whether the merchant is registered with the promotion and marketing service, or the like.

As used herein, the terms "electronic marketing communication" and "message" refer to any electronically generated information content provided by the promotion and marketing service to a consumer for the purpose of marketing a promotion, good, or service to the consumer. Electronic marketing communications may include any email, short message service (SMS) message, web page, application interface, or the like electronically generated for the purpose of attempting to sell or raise awareness of a product, service, promotion, or merchant to the consumer.

It should be appreciated that the term "electronic marketing communication" implies and requires some portion of the content of the communication to be generated via an electronic process. For example, a telephone call made from an employee of the promotion and marketing service to a consumer for the purpose of selling a product or service would not qualify as an electronic marketing communication, even if the identity of the call recipient was selected by an electronic process and the call was dialed electronically, as the content of the telephone call is not generated in an electronic manner. However, a so-called "robo-call" with content programmatically selected, generated, or recorded via an electronic process and initiated by an electronic system to notify a consumer of a particular product, service, or promotion would qualify as an electronic marketing communication. Similarly, a manually drafted e-mail sent from an employee of the promotion and marketing service to a consumer for the purpose of marketing a product would not qualify as an electronic marketing communication. However, a programmatically generated email including marketing materials programmatically selected based on electronic marketing information associated with the recipient would qualify as an electronic marketing communication.

As used herein, the term "business analytic data" refers to data generated by the promotion and marketing service based on electronic marketing information to assist with the operation of the promotion and marketing service and/or one or more merchants. The various streams of electronic marketing information provided to and by the promotion and marketing service allow for the use of sophisticated data analysis techniques that may be employed to identify correlations, relationships, and other associations among elements of electronic marketing information. These associations may be processed and formatted by the promotion and marketing service to provide reports, recommendations, and services both internal to the promotion and marketing service and to merchants in order to improve the process by which merchants and promotion and marketing service engage with consumers. For example, the promotion and marketing service may analyze the electronic marketing information to identify an increased demand for a particular product or service, and provide an electronic report to a merchant suggesting the merchant offer the particular product or service. Alternatively, the promotion and marketing service may identify that a particular product or service is not selling or resulting in the merchant losing money, customers, or market share (e.g., after consumers order a particular menu item, they never come back to the merchant), and suggest that the merchant should discontinue offering that product or service.

It should be appreciated that the term "business analytic data" is intended to refer to electronically and programmatically generated data. For example, a printed report or letter manually drafted by an employee of the promotion and marketing service would not be said to include business analytic data, even if said data was used by the employee during the drafting process, while a data disk or downloaded file containing analytics generated by the promotion and marketing service would be considered business analytic data.

As used herein, the terms "authoring service" and "authoring system" refer to a particular application, module, algorithm, service, device, or the like that is capable of causing the generation of an electronic marketing communication. Authoring services may select content for the electronic marketing communication or message or merely send a signal indicating another module or service should generate or select content for the electronic marketing communication.

Technical Underpinnings and Implementation of Exemplary Embodiments

Merchants, including manufacturers, wholesalers, and retailers, have spent a tremendous amount of time, money, manpower, and other resources to determine the best way to market their products to consumers. Whether a given marketing effort is successful is often determined based on the return-on-investment offered to the merchant from increased awareness, sales, and the like of the merchant's goods and services in exchange for the resources spent on the marketing effort. In other words, optimal marketing techniques generally maximize the benefit to the merchant's bottom line while minimizing the cost spent on marketing. To this end, a merchant's marketing budget may be spent in a variety of different manners including advertising, offering of discounts, conducting market research, and various other known marketing techniques. The end goal of these activities is to ensure that products are presented to consumers in a manner that maximizes the likelihood that the consumers will purchase the product from the merchant that performed the marketing activities while minimizing the expense of the marketing effort.

The advent of electronic commerce has revolutionized the marketing process. While merchants would typically have to perform costly market research such as focus groups, surveys, and the like to obtain detailed information on consumer preferences and demographics, the digital age has provided a wealth of new consumer information that may be used to optimize the marketing and sales process. As a result, new technologies have been developed to gather, aggregate, analyze, and report information from a variety of electronic sources.

So-called "clickstream data" provides a robust set of information describing the various interactions consumers have with electronic marketing communications provided to them by merchants and others. Promotion and marketing services have been developed with sophisticated technology to receive and process this data for the benefit of both merchants and consumers. These services assist merchants with marketing their products to interested consumers, while reducing the chance that a consumer will be presented with marketing information in which the consumer has no interest. Some promotion and marketing services further leverage their access to a trove of electronic marketing information to assist merchants and consumers with other tasks, such as offering improved merchant point-of-sale systems, improved inventory and supply chain management, improved methods for delivering products and services, and the like.

Unlike conventional marketing techniques related to the use of paper or other physical media (e.g., coupons clipped from a weekly newspaper), promotion and marketing services offer a wealth of additional electronic solutions to improve the experience for consumers and merchants. The ability to closely monitor user impressions provides the ability for the promotion and marketing service to gather data related to the time, place, and manner in which the consumer engaged with the impression (e.g., viewed, clicked, moused-over) and obtained and redeemed the promotion. The promotion and marketing service may use this information to determine which products and services are most relevant to the consumer's interest, and to provide marketing materials related to said products and services to the consumer, thus improving the quality of the electronic marketing communications received by the consumer. Merchants may be provided with the ability to dynamically monitor and adjust the parameters of promotions offered by the promotion and marketing service, ensuring that the merchant receives a positive return on their investment. For example, the merchant can closely monitor the type, discount level, and quantity sold of a particular promotion on the fly, while with traditional printed coupons the merchant would not be able to make any changes to the promotion after the coupon has gone to print. Each of these advancements in digital market and promotion distribution involve problems unique to the digital environment not before seen in traditional print or television broadcast marketing.

However, these promotion and marketing services are not without problems. Although electronic marketing information provides a wealth of information, the inventors have determined that existing techniques may not always leverage this information in an efficient or accurate manner. Technology continues to rapidly advance in the field of analytics and the processing of this information, offering improved data gathering and analysis techniques, resulting in more relevant and accurate results provided in a more efficient manner. Electronic marketing services continue to evolve and provide improved methods for engaging consumers and spreading awareness of products offered by promotion and marketing services.

In many cases, the inventors have determined that these services are constrained by technological obstacles unique to the electronic nature of the services provided, such as constraints on data storage, machine communication and processor resources. The inventors have identified that the wealth of electronic marketing information available to these services and the robust nature of electronic marketing communications techniques present new challenges never contemplated in the world of paper coupons and physical marketing techniques. The inventors have further determined that even technological methods that leverage computers for statistical analysis and consumer behavior modeling (e.g., television rating systems) fail to address problems associated with providing relevant, high quality electronic marketing communications (e.g., impressions) to consumers in a manner that maximizes accuracy, minimizes error, is user friendly and provides for efficient allocation of resources. Embodiments of the present invention as described herein serve to correct these errors and offer improved resource utilization, thus providing improvements to electronic marketing services that address problems arising out of the electronic nature of those services.

The wealth of information available to promotion and marketing services also causes additional novel problems particular to the realm of programmatic generation of electronic marketing communications. Because relevant electronic marketing communications can be determined based on a variety of different signals, consumers may be inundated with communications notifying them of relevant products, services, and promotions. Flexible, modular, systems for identifying relevant electronic marketing communications may employ a variety of different modules and applications that are each capable of independently generating electronic marketing communications. The inventors have realized that if these various authoring services are allowed to indiscriminately send electronic marketing communications, consumers may be overwhelmed with a high volume of relevant electronic marketing communications. Too many electronic marketing communications may cause consumers to reduce or disable further communications to reduce clutter in their inboxes, and the most relevant electronic marketing communications may not be readily distinguishable from less relevant electronic marketing communications.

In response to these problems and other problems, the inventors have recognized a need for methods, systems, and apparatuses that provide an intermediate arbiter between authoring services and transmitted electronic marketing communications to evaluate and authorize outgoing electronic marketing communications before transmission. The inventors have further recognized additional technical challenges in the implementation of such a system. In particular, systems for arbitrating and approving outgoing messages must have an awareness of the particular preferences and challenges of consumers or groups of consumers. However, processing of individual consumer records, preferences, and authorizing individual outgoing communications on a per-consumer-basis is a time and processing-intensive task. While parallel computing techniques may be employed to speed such processes, these parallel computing techniques run the risk of corrupting data if consumer records are accessed simultaneously by multiple processes at once. Accordingly, the inventors have developed novel techniques for managing concurrent and parallel processing of multiple tasks associated with the review, approval, and transmission of electronic marketing communications. In particular, the inventors have developed a system that employs message queues associated with particular message recipients or groups of recipients that include concurrency locks to facilitate the use of parallel processes for adding and removing messages from queues, calculating whether individual messages should be sent, and actual transmission of those messages.

To evaluate whether a particular communication should be sent to a particular recipient, the inventors have also recognized that a recipient preference model may be employed to determine whether a given communication is worth sending to the given recipient. In some embodiments, the recipient preference model is the result of a machine learning computation that also captures the relevant state of the recipient (e.g., whether the recipient is subscribed, interests the recipient has indicated, recent purchases, or the like).

The inventors have also determined that the use of real-time signals provided to a promotion and marketing service allows the promotion and marketing service to offer electronic marketing communications to consumers that are immediately relevant to the situation of the consumer. However, the time-sensitive nature of these electronic marketing communications often means that, if such a time-sensitive communication was processed at the end of a message queue, the communication might not be sent until the data that triggered the signal was stale (e.g., after the consumer has left a location associated with the electronic marketing communication). The inventors have thus realized that it is desirable to have a mechanism for preempting the normal operation of a message queue in response to certain events. As such, embodiments of the present invention advantageously provide such a mechanism for detecting messages associated with preemptive events and moving such messages ahead of other messages in an incoming message queue.

The inventors have also recognized that it is possible to utilize data regarding impressions and resulting sales from electronic marketing communications to identify correlations between the transmission circumstances of electronic marketing communications and the resulting success rate of such electronic marketing communications. To this end, the inventors have developed experimental services that enable a "closed loop" system that dynamically determines optimal circumstances for transmitting electronic marketing communications. The inventors have also developed systems and processes that allow administrators of a promotion and marketing service to run experiments to identify such correlations and to otherwise improve the process by which electronic marketing communications are transmitted to consumers.

System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Merchants may access a promotion and marketing service 102 via a network 112 (e.g., the Internet, or the like) using computer devices 108A through 108N and 110A through 110N, respectively (e.g., one or more consumer devices 108A-108N or one or more merchant devices 110A-110N). The promotion and marketing service 102 may function to manage transmission of electronic marketing communications as described herein and below. Moreover, the promotion and marketing service 102 may comprise a server 104 in communication with a database 106.

The server 104 may be embodied as a computer or computers as known in the art. The server 104 may provide for receiving of electronic data from various sources, including but not necessarily limited to the consumer devices 108A-108N and the merchant devices 110A-110N. For example, the server 104 may be operable to receive and process clickstream data provided by the consumer devices 108 and/or the merchant devices 110. The server 104 may also facilitate e-commerce transactions based on transaction data provided by the consumer devices 108 and/or the merchant devices 110. The server 104 may facilitate the generation and providing of various electronic marketing communications and marketing materials based on the received electronic marketing information.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include, without limitation, user account credentials for system administrators, merchants, and consumers, data indicating the products and promotions offered by the promotion and marketing service, electronic marketing information, analytics, reports, financial data, and/or the like.

The consumer devices 108A-108N may be any computing device as known in the art and operated by a consumer. Electronic data received by the server 104 from the consumer devices 108A-108N may be provided in various forms and via various methods. For example, the consumer devices 108A-108N may include desktop computers, laptop computers, smartphones, netbooks, tablet computers, wearables, and the like. The information may be provided through various sources on these consumer devices.

In embodiments where a consumer device 108 is a mobile device, such as a smart phone or tablet, the consumer device 108 may execute an "app" to interact with the promotion and marketing service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing service 102 may leverage the application framework offered by the mobile operating system to allow consumers to designate which information is provided to the app and which may then be provided to the promotion and marketing service 102. In some embodiments, consumers may "opt in" to provide particular data to the promotion and marketing service 102 in exchange for a benefit, such as improved relevancy of marketing communications offered to the user. In some embodiments, the consumer may be provided with privacy information and other terms and conditions related to the information provided to the promotion and marketing service 102 during installation or use of the app. Once the consumer provides access to a particular feature of the mobile device, information derived from that feature may be provided to the promotion and marketing service 102 to improve the quality of the consumer's interactions with the promotion and marketing service.

For example, the consumer may indicate that they wish to provide location information to the app from location services circuitry included in their mobile device. Providing this information to the promotion and marketing service 102 may enable the promotion and marketing service 102 to offer promotions to the consumer that are relevant to the particular location of the consumer (e.g., by providing promotions for merchants proximate to the consumer's current location). It should be appreciated that the various mobile device operating systems may provide the ability to regulate the information provided to the app associated with the promotion and marketing service 102. For example, the consumer may decide at a later point to disable the ability of the app to access the location services circuitry, thus limiting the access of the consumer's location information to the promotion and marketing service 102.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, the consumer device 108 may interact through the promotion and marketing service 102 via a web browser. As yet another example, the consumer device 108 may include various hardware or firmware designed to interface with the promotion and marketing service 102 (e.g., where the consumer device 108 is a purpose-built device offered for the primary purpose of communicating with the promotion and marketing service 102, such as a store kiosk).

The merchant devices 110A-110N may be any computing device as known in the art and operated by a merchant. For example, the merchant devices 110A-110N may include a merchant point-of-sale, a merchant local marketing device, a merchant e-commerce server, a merchant inventory system, or a computing device accessing a web site designed to provide merchant access (e.g., by accessing a web page via a browser using a set of merchant account credentials). The merchant devices 110A-110N may also be mobile devices as described above with respect to the consumer devices 108A-108N.

Electronic data received by the promotion and marketing service 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing service 102 to enable the promotion and marketing service 102 to generate promotions or other marketing information to be provided to consumers.

An example of a data flow for exchanging electronic marketing information among one or more consumer devices, merchant devices, and the promotion and marketing service is described below with respect to FIG. 3.

Example Apparatuses for Implementing Embodiments of the Present Invention

The server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, promotion management circuitry 210, message authoring circuitry 212, message management circuitry 214, and message transmission circuitry 216. The apparatus 200 may be configured to execute the operations described above with respect to FIG. 1 and below with respect to FIGS. 4-12. Although these components 202-216 are described with respect to functional limitations, it should be understood that the particular implementations necessarily include the use of particular hardware. It should also be understood that certain of these components 202-216 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The promotion management circuitry 210 includes hardware configured to generate, provide, and manage promotions offered by a promotion and marketing service. The promotion management circuitry 210 may be configured to receive a request from a merchant to generate a new promotion and, in response to the request, facilitate the offering of the new promotion via the promotion and marketing service. In some embodiments, the promotion management circuitry 210 may be further configured to programmatically and/or automatically provide, offer, or generate promotions in response to the occurrence of a criterion or criteria. For example, a merchant may define a particular set of criteria that cause the promotion management circuitry 210 to offer a particular promotion or promotions. The promotion management circuitry 210 may manage promotions stored in a memory, such as the memory 204, and store promotions in the memory in response to the promotion being newly generated. In some embodiments, the promotion management circuitry 210 may dynamically control the offering parameters for a promotion or promotions in response to the occurrence of the set of criteria. The promotion management circuitry 210 may utilize processing circuitry, such as the processor 202, to perform these actions. The promotion management circuitry 210 may receive the request and/or otherwise communicate with a merchant device via a network interface provided by the communications circuitry 208. However, it should also be appreciated that, in some embodiments, the promotion management circuitry 210 may include a separate processor to manage the offering of promotions via a promotion and marketing service. The promotion management circuitry 210 is therefore implemented using hardware components of the apparatus configured by either hardware or software for implementing these planned functions.

The message authoring circuitry 212 includes hardware configured to generate one or more messages for processing by the message management circuitry 214 and possible eventual transmission to consumers via message transmission circuitry 216. The message authoring circuitry 212 is configured to identify information that may be relevant to consumers, such as particular promotions, goods, or services, or the like, and to use said information as content for an electronic marketing communication. Alternatively, the message authoring circuitry 212 may include hardware configured to generate a signal that causes another component of a promotion and marketing service to create an electronic marketing communication. For example, the message authoring circuitry 212 may include hardware configured to identify that a consumer has not been contacted for a particular period of time and to notify another service to select appropriate content for the consumer. The message authoring circuitry 212 may include a plurality of separate authoring systems, reflecting different sources of electronic marketing communications. The message authoring circuitry 212 includes processing circuitry, such as the processor 202 to perform these actions. It should also be appreciated that, in some embodiments, the message authoring circuitry 212 may include a separate processor or the like to generate one or more electronic marketing communications. The message authoring circuitry 212 is therefore implemented using hardware components of the apparatus configured by either hardware or software for implementing these planned functions.

The message management circuitry 214 includes hardware configured to authorize the transmission of electronic marketing communications to consumers. The message management circuitry 214 may function as an arbiter or advocate for particular consumers to moderate the activities of message authors and to prevent consumers from being inundated with too many electronic marketing communications. As noted above, embodiments of the message management circuitry 214 may include hardware for implementing a framework for managing a plurality of message queues associated with consumers or groups of consumers. The message management circuitry 214 may also include hardware configured to provide a preemption mechanism to alter a message approval process dynamically in response to receiving a particular signal or event. The message management circuitry may also include an experimental service that allows embodiments to test particular message transmission variables and techniques to improve the process by which electronic marketing communications are authorized to be sent. The message management circuitry 214 includes processing circuitry, such as the processor 202, configured to perform these functions. The message management circuitry 214 also includes data storage, such as the memory 204, to store and access relevant data including temporary storage of electronic marketing communications, storage of recipient preference models, and storage of data structures for use in the management of transmission of electronic marketing communications. It should also be appreciated that, in some embodiments, the message management circuitry 214 may include a separate processor or the like to manage the transmission of one or more electronic marketing communications. The message management circuitry 214 is therefore implemented using hardware components of the apparatus configured by either hardware or software for implementing these planned functions. Example processes and implementations of the functionality of the message management circuitry 214 are described further below with respect to FIGS. 4-12.

The message transmission circuitry 216 includes hardware configured to transmit electronic marketing communications to designated recipients. The message transmission circuitry 216 may transmit messages via various methods, including but not limited to email servers, mobile notification systems, or other methods for transmission of electronic marketing communications. It should be appreciated that the transmission circuitry 216 may include multiple separate and distinct delivery mechanisms, and the message management circuitry 214 may send separate communications to each delivery mechanism upon approval of an outgoing electronic marketing communication. The message transmission circuitry 216 may include processing circuitry, such as the processor 202, configured to perform these functions. It should also be appreciated that, in some embodiments, the message transmission circuitry 216 may include a separate processor, networking circuitry, protocols, and messaging techniques, including but not limited to Send Mail Transfer Protocol (SMTP), Short Message Service (SMS), push notifications, TCP/IP or other Internet Protocol based protocols, Wi-Fi, infrared, or any other OSI or Internet-based communication protocols to facilitate the transmission of one or more electronic marketing communications to one or more recipients. The message transmission circuitry 216 is therefore implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by example displays described herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Example Electronic Marketing Information Service Data Flow

FIG. 3 depicts an example data flow 300 illustrating interactions between a server 302, one or more consumer devices 304, and one or more merchant devices 306. The server 302 may be implemented in the same or a similar fashion as the server 104 as described above with respect to FIG. 1 and/or the apparatus 200 described above with respect to FIG. 2, the one or more consumer devices 304 may be implemented in the same or a similar fashion as the consumer devices 108A-108N as described above with respect to FIG. 1, and the one or more merchant devices 306 may be implemented in the same or a similar fashion as the merchant devices 110A-110N as described above with respect to FIG. 1.

The data flow 300 illustrates how electronic information may be passed among various systems when employing a server 302 in accordance with embodiments of the present invention. The one or more consumer devices 304 and/or one or more merchant devices 306 may provide a variety of electronic marketing information to the server 302 for use in providing promotion and marketing services to the consumer. This electronic marketing information may include, but is not limited to, location data, clickstream data, transaction data, communication channel data, and/or discretionary data.

As a result of transactions performed between the one or more consumer devices 304 and the server 302, the server 302 may provide fulfillment data to the consumer devices. The fulfillment data may include information indicating whether the transaction was successful, the location and time the product will be provided to the consumer, instruments for redeeming promotions purchased by the consumer, or the like.

In addition to the e-commerce interactions with the one or more consumer devices 304 offered by the server 302, the server 302 may leverage information provided by the consumer devices to improve the relevancy of electronic marketing communications to individual consumers or groups of consumers. In this manner, the server 302 may determine promotions, goods, and services that are more likely to be of interest to a particular consumer or group of consumers based on clickstream data, location data, and other information provided by and/or relating to particular consumers. For example, the server 302 may detect the location of a consumer based on location data provided by the consumer device, and offer promotions based on the proximity of the consumer to the merchant associated with those promotions.

Alternatively, the server 302 may note that the consumer has an interest in a particular hobby (e.g., skiing) based on electronic marketing information associated with the consumer (e.g., a browser cookie that indicates they frequently visit websites that provide snowfall forecasts for particular ski resorts), and offer promotions associated with that hobby (e.g., a promotion offering discounted ski equipment rentals or lift tickets). It should be appreciated that a variety of different types of electronic marketing information could be provided to the server 302 for the purpose of improving the relevancy of marketing communications. It should also be appreciated that this electronic marketing information may be received from a variety of electronic sources, including various consumer devices, merchant devices, and other sources both internal and external to a promotion and marketing service. For example, other data sources may include imported contact databases maintained by merchants, electronic survey questions answered by consumers, and/or various other forms of electronic data.

It should also be appreciated that the server 302 may also control other factors of the electronic marketing communications sent to the consumer other than the particular promotions included in the electronic marketing communication. For example, the server 302 may determine the form, structure, frequency, and type of the electronic marketing communication. As with the content of the electronic marketing communication, these factors may be programmatically determined according to various methods, factors, and processes based on electronic data received by the server 302 for the purpose of maximize the likelihood that the communication will be relevant to the recipient consumer.

The server 302 interactions with the one or more merchant devices 306 may be related to enabling the merchant to market their products using a promotion and marketing service. For example, the one or more merchant devices 306 may provide promotion data defining one or more promotions to be offered by the promotion and marketing service on behalf of the merchant. The server 302 may receive this information and generate information for providing such promotions via an e-commerce interface, making the promotions available for purchase by consumers. The server 302 may also receive information about products from the one or more merchant devices 306. For example, a merchant may provide electronic marketing information indicating particular products, product prices, inventory levels, and the like to be marketed via a promotion and marketing service. The server 302 may receive this information and generate listing information to offer the indicating products to consumers via a promotion and marketing service.

The one or more merchant devices 306 may also receive information from the server 302. For example, in some embodiments a merchant may obtain access to certain business analytic data aggregated, generated, or maintained by the server 302. As a particular example, a merchant might offer to pay for consumer demographic data related to products or services offered by the merchant. It should be appreciated however, that a merchant may not need to list any products or services via the promotion and marketing service in order to obtain such data. For example, the promotion and marketing service may enable merchants to access electronic marketing data offered via the promotion and marketing service based on a subscription model.

The one or more merchant devices 306 may also receive electronic compensation data from the server 302. For example, when a promotion or product is sold by the promotion and marketing service on behalf of the merchant, a portion of the received funds may be transmitted to the merchant. The compensation data may include information sufficient to notify the merchant that such funds are being or have been transmitted. In some embodiments, the compensation data may take the form of an electronic wire transfer directly to a merchant account. In some other embodiments, the compensation data may indicate that a promotion or product has been purchased, but the actual transfer of funds may occur at a later time. For example, in some embodiments, compensation data indicating the sale of a promotion may be provided immediately, but funds may not be transferred to the merchant until the promotion is redeemed by the consumer.

Embodiments advantageously provide for improvements to the server 302 by improving the quality of electronic marketing communications transmitted from the server 302 to the consumer devices 304 by identifying trending promotions for inclusion in said electronic marketing communications. In this manner, embodiments offer improvements to the methods by which particular promotions are selected for as trending and improvements to the methods for which velocity metrics are calculated to select those trending promotions. In particular, embodiments provide improved techniques for evaluating transaction data over a plurality of time periods to identify the velocity metrics, along with sophisticated evaluation and filtering techniques to ensure that promotions identified as trending are available, valid, useful, and/or of interest to consumers. These improvements serve to reduce the number of electronic marketing communications that must be sent by the server 302 in order to produce sales, conserving system resources. Furthermore, by providing more accurate identification of trending promotions, the consumer may gain the same benefit with less system interaction, thus conserving system resources and improving the technical functionality of both the consumer devices 304 and the server 302.

Exemplary Data Inputs and Outputs

FIG. 4 illustrates an example data flow interaction 400 depicting inputs and outputs among components of a system implementing a message management system in accordance with some exemplary embodiments of the present invention. The data flow illustrates incoming and outgoing data to an "inbox manager" or message management system 402. The inbox manager 402 provides message management functionality to approve the transmission of electronic marketing communications generated by one or more authoring systems. The inbox manager 402 receives information about one or more "campaigns" 404 or sets of electronic marketing communications with content (e.g., goods, getaways) intended for an audience of intended recipients. The inbox manager 402 may further receive a set of triggers 406. The triggers 406 include criteria that may result in the transmission of an electronic marketing communication, such as when a consumer has left an item in their cart without making a purchase or to notify the consumer of the shipment status of an order.

The inbox manager 402 may also receive a personalized data store 408 indicating a set of preferences and other consumer data associated with particular consumers or groups of consumers. The personalized data store 408 may include a profile for each consumer and a set of demographics, characteristics, preferences, or the like about those consumers. The consumer information may be received via a feedback mechanism that monitors the habits and actions of consumers with respect to transmitted electronic marketing communications (e.g., whether a product was purchased, whether the electronic marketing communication was viewed, or the like).

The inbox manager 402 may cause transmission of a set of electronic marketing communications 410 according to a computed schedule. For example, the electronic marketing communications 410 for a particular product or service type may be sent at a particular date or time.

The electronic marketing communications 410 may be sent to one or more transmission services, such as an email dispatcher 412 or a mobile dispatcher 414. In the present example, the email dispatcher 412 functions as an email server to send an email to the consumer, while the mobile dispatcher 414 triggers a mobile notification to be sent to a consumer device.

Embodiments may also provide an administration user interface (UI) 418 for interacting with the inbox manager 402. The administration UI 418 may provide the capability for administrators to manually trigger, configure, and/or override actions of the inbox manager 402.

The inbox manager 402 may include a data preparation and modeling service 420, a personalized calendar 422, and a decision algorithm 424. The data preparation and modeling service 420 may compare the set of triggers 406 and received campaigns 404 to the user data 408 to determine whether and when the triggers are met for sending electronic marketing communications. The personalized calendar 422 may provide a designated set of dates and times that are available for transmission of electronic marketing communications. For example, the personalized calendar 422 may identify a particular number of times of days (e.g., 4 times per day) when electronic marketing communications may be transmitted for a particular consumer or consumers. The decision algorithm 424 may utilize the calendar 422 and the results of the data preparation and modeling service 420 to determine whether and when to authorize transmission of electronic marketing communications as identified in the campaign 404. Example systems and processes for implementing these features are described further below with respect to FIGS. 5-12.

Example Data Flow Among System Components

FIG. 5 illustrates an example data flow interaction 500 among components of a system implementing a message management system in accordance with some exemplary embodiments of the present invention. In some embodiments, the data flow 500 illustrates interaction among components of an apparatus such as the apparatus 200 described above. Components with similar names as those described above with respect to FIG. 2. May be implemented in the same or a similar manner, though it should also be appreciated that embodiments may be implemented in alternative manners or with alternative functionality as well.

The data flow 500 illustrates the interaction between message authoring circuitry 504, message management circuitry 502, and message transmission circuitry 506. The message authoring circuitry 504 functions to generate one or more messages for transmission to consumers. The generated messages are provided to the message management circuitry 502. Approved messages are authorized by the message management circuitry 502 and provided to the message transmission circuitry 506 for transmission to consumers. In some embodiments, the message transmission circuitry 506 may also provide status information, throughput information, or other data to the message management circuitry 508 to allow the message management circuitry 508 to take into account the status of the message transmission circuitry 506 when approving outgoing messages. For example, if an output buffer of the message transmission circuitry 506 is saturated, the message transmission circuitry 506 may notify the message management circuitry 502 and approve fewer messages until the buffer is no longer saturated. In some embodiments, the message management circuitry 502 may ensure that sufficient buffer space remains at the message transmission circuitry 506 to allow the message management circuitry 502 to send preemptive messages.

In this manner, embodiments may further provide for rate control of outgoing messages. Since the message management circuitry 502 is aware of the capabilities and status of the message transmission circuitry 506, the message management circuitry 502 can control the volume of messages sent to the message transmission circuitry 506 to ensure responsiveness of outgoing messages across the aggregate of all recipients. Without the message management circuitry 502 to control the rate at which messages are approved for sending to the message transmission circuitry 506, the message transmission circuitry 506 could become overwhelmed to the point that it may take hours for a given message to be transmitted after being forwarded to the message transmission circuitry 506. In such cases, it may become difficult, if not impossible, to send time-sensitive messages to recipients in a timely manner, thus reducing the effectiveness of messages based on location, time of day, and other time-sensitive factors. Without rate control mechanisms provided by the message management circuitry 502, time sensitive messages may become trapped in a traffic jam.

By employing rate control techniques, scheduled message timers, and systems that are aware of a message buffer send status, embodiments ensure that the time from the receipt of a particular message to the transmission of said message is tuned such that the message transmission circuitry's buffer is drainable within a particular time (which, in some embodiments, is configurable by the message management circuitry, a system administrator, or the like), such as a few minutes. Preemptive messages are then ensured to be able to be transmitted within a predictable period, ensuring that high-priority messages are sent within a predictable amount of time. The message management circuitry 502 may thus ensure that enough messages are approved for transmission to the message transmission circuitry 506 to keep messages flowing at a steady rate, and also that too many messages are not sent to a transmission buffer of the message transmission circuitry 506, thus ensuring that high-priority or time-sensitive messages may be transmitted within a predictable time period.

The message management circuitry 502 may include a coordination service 508, a dispatch service 510, recipient preference models 512, consumer events 514, a forecast service 516, one or more message budgets 518, an audit service 520, a registration service 522, and an experiment service 524.

The coordination service 508 functions to, using an internal model, throttle the rate of a given type of message from a given authoring service to a given recipient. The internal model used by the coordination service may be included in the recipient preference models 512, which provide for models for whether and when to send electronic marketing communications to particular users. The coordination service 508 functions to receive electronic marketing communications from the message authoring circuitry 504. The received electronic marketing communications may be placed onto a queue or into another data structure that functions to store the messages while they are evaluated before authorizing transmission.

The coordination service 508 may also manage transmission of electronic marketing communications by particular authoring services through the use of message budgets 518. Budgets may be assigned for particular authoring services, for particular marketing campaigns, or for a variety of other services. The coordination service 508 may create and manage message budgets 518, or the forecast service 516 may be employed to create the budgets 518. Budgets may be assigned to a particular authoring service or messaging campaign, separately from coordination of transmission of messages to individual recipients.

The coordination service 508 may also receive consumer events 514 to which may be employed to determine whether to send a particular electronic marketing communication. The events 514 may also be employed to identify whether and when to preempt normal processing of electronic marketing communications.

The coordination service 508 may transmit approved messages to a dispatch service 510 which functions to forward electronic marketing communications that have been approved by the coordination service 508 to message transmission circuitry 506. The dispatch service 510 may also communicate with the message transmission circuitry 506 to receive status information from the message transmission circuitry, such as an expected transmission throughput, a buffer status, or the like. The status information may be sent to the coordination service 508 to be used during the message evaluation process.

The forecast service 516 supplies other internal systems that utilize a message budget (e.g., message authoring services) with a budget of messages for a particular time period, based on internal models. Authoring services may send messages within the budget, allowing some variability in instantaneous rates. The budget may be enforced by the coordination service 508 directly, or by the audit service 520. Budgets and other output by the forecast service 156 may generally be used as a mechanism to account for aggregate behavior even when considering transmission of messages to individual recipients. Budgets may thus provide a mechanism for managing an overall send rate for a given messaging campaign while still treating recipients as individuals.

The forecast service 516 also creates internal models that summarize detailed response data into parameters for one or more internal models. Those models may provide a feedback mechanism to determine budgets, coordination levels, and schedules for the respective services.

Budgets may be determined in a variety of manners. A first model takes into account the fact that different types of electronic marketing communications may have different priority levels and expectations. For example, transmission of electronic marketing communications could be compared to filling a jar with boulders, rocks, and sand. If many lower priority communications are sent, the budget could quickly be filled with such communications, similar to filling ajar with sand first. However, more important communications could be sent first, akin to placing boulders into the jar first, leaving room for smaller gaps for lower priority communications, akin to rocks and sand. As such, a given budget may include a particular number of each different communication type, and a set of criteria for identifying how to classify potential electronic marketing communications. For example, high budget "boulder" communications might be communications that are relevant and that generally should always be sent, such as sending a daily top promotion, top deals from a particular authoring service (e.g., products, getaways), or the like. Lower budget "rock" communications might be promotion expiration warnings, bonus incentives, and the like. Lowest budget "sand" communications could be short time window messages or other messages that should nearly always be sent if the context and value of the communication is determined to be high enough, such as in the case of hyper local proximity deals.

In some embodiments, the budget may plan for "boulder" communications by using some pre-defined budget. External systems may incorporate those budgets within a broad context. "Rocks" and "sand" communications may have a pinpoint context, since the time frames and systems integration allow the consideration of a narrow set of features. Even though embodiments may not know the specifics of a given rock or sand communications, the message management module 502 may be aware of the rates of the transmission allowed, and some ability to rank order messages. Provided the rock or sand message can be ranked quickly and compared against an allowed rate limit, the coordination service 508 would be able to issue a send/no-send decision quickly.

Another example budget system is to implement a priority queue. If a total score is applied for each communication, embodiments may insert each email into a virtual priority queue(s). The coordination service 508 may pull emails from such a queue(s) according to a consumer-specific rate. Such a queue allows a message score to change, depending on circumstances as they arise, and therefore change its position in the queue.

Different authoring systems may implement budgets in different manners. One possible distinction between authoring systems is the difference between broad context and pinpoint context authoring systems. The main difference between these authoring systems is where a budget influences a push notification.

Broad context authoring systems may incorporate budget constraints within a larger set of deal selection criteria. In this way, the budget may act as a filter to cut down on the possible set of factors to consider. Broad context systems may submit pre-vetted message requests to the dispatch service 510 directly.

For example, if in the absence of a budget, an example authoring system may submit 5 daily promotion notifications. Upon arrival at the message management circuitry, only 2 notifications may pass the budget. Inside the 3 rejected notifications, there may be high ranking promotions that are higher than in the 2 accepted notifications, On the other hand, if the authoring system knows about the limitations up front, the authoring system might have submitted the electronic marketing communications in a different order (e.g., placing the high ranking promotions first).

If the message management circuitry rejects a submitted notification request, and content inside those notifications are subject to particular rules specifying a required recency or freshness, then embodiments may inform the authoring system that a notification has been rejected. The authoring system may then adjust its frequency counter for that content, as it did not reach the user account's inbox.

Pinpoint context systems may defer responsibility for budget constraints to the coordination service 508. The coordination service 508 may choose among a set of candidate message requests, and reject some fraction of messages. The coordination service 508 may send vetted message requests to the dispatch service 510 and inform authoring systems of decisions.

The audit service 520 monitors the send rates for messages, and compares to either the budget 518 or some other absolute metrics. The audit service 520 also sends appropriate alerts to internal systems and users and supplies data for the experiment service 524 feedback loops.

The registration service 522 accepts registrations from authoring services. The registration service 522 allows authoring services to request a message budget and to configure authoring-service-specific internal models. The registration service 522 may also support a negotiation between authoring services and the message management circuitry 502 that defines the terms by which the authoring service 504 will send and the message management circuitry 502 will process messages. The registration service 522 may manage a process by which message types and attributes associated with those message types are agreed upon by the authoring service 504 and the message management circuitry 502. For example, registration process may include defining certain message types as preemptive, establishing an initial budget for the authoring service, defining particular types of communications (e.g., push notification, email) that the authoring service may send, defining particular content types for certain message types (e.g., whether the message type can contain audio, video, images, hyperlinks, and a number of each), defining the particular impact of each message type on a message budget for the authoring system, and the like.

The experiment service 524 allows clients to configure different settings within the Inbox Management services and run experiments in a designed fashion. Settings include audience selection, message type, and algorithms.

Exemplary Data Flow for Building a Recipient Preference Model

FIG. 6 illustrates an example data flow interaction 600 for building a recipient preference model for use by a message management system in accordance with some exemplary embodiments of the present invention. To enable message management circuitry to make personalized decisions, a user preference model may be built to capture personalized data relating to each consumer. The data flow 600 illustrates how electronic information from a plurality of data sources 612 are combined with a set of real-time events 608 and data from a coordination service 602 to generate a recipient preference model to determine whether and when to transmit electronic marketing communications to consumers.

The recipient preference model may capture data such as, but not limited to, a preferred email calendar, a preferred push notifications calendar, the consumer's time zone, a list of preferred time ranges of day (e.g., 1 PM-3 PM, 5 PM-7 PM, 8 AM-10 AM), a maximum number of push notifications per day, a maximum number of SMS per day, a maximum number of emails per day, a maximum number of touches per day, a maximum number of touches per week, an actual number of emails sent to the consumer, an actual number of push messages sent to the consumer, an actual number of "touches" or interactions by and with the consumer, whether the consumer has any subscriptions or subscribed feeds, and/or whether the consumer has been blacklisted from any sites or content.

A recipient preference model is not static. The recipient preference model may be bootstrapped in the beginning with default values, but afterwards the values will typically be updated based on consumer engagement data and/or machine learning results based on the success or failure of prior transmitted electronic marketing communications. For example, a consumer A is initially set to channel preferences=default, after sending emails to this consumer for a month, the engagement data suggests that the consumer is more engaged towards local promotions, so a model that reads the engagement data would like to update this consumer preference to set local promotions electronic marketing communications as preferred electronic marketing communications for that user.

Data from a plurality of data sources 612 is aggregated by a data aggregation model 610. The data sources 612 may be any source of data related to the particular consumer or consumer, such as social network websites, browser cookies, information voluntarily provided by consumers, or the like. Real-time events 608 such as consumer interactions with a promotion and marketing service (e.g., purchases), location data, and the like may also be aggregated by a data aggregation model 606 and provided to the recipient preference model 604. Similarly, information from a coordination service 602, such as when, whether, and how many electronic marketing communications were sent to the consumer may also be used to generate the recipient preference model 604.

Exemplary Logical Object Relationships

FIG. 7 illustrates exemplary object relationships 700 among components of a message management system in accordance with some exemplary embodiments of the present invention. In the present context, outgoing communications that may be evaluated to be sent as transmitted electronic marketing communications are described as "events". The relationship diagram 700 illustrates an example embodiment that implements a framework for processing electronic marketing communications in a parallel processing architecture that allows concurrent processing tasks.

A recipient event heap 716 includes received campaign events for every user appearing in the recipient event heap 716. An accepted campaign event may be pre-empted by another event, so not all campaign events result in a send. Events in the recipient event heap 716 may be indexed by users, send times, and related campaigns.

The recipient preference model 706 captures consumer preferences, including send frequencies and cadences, campaign type mix, seasonality, time of day and day of week preferences.

Recipient accounts exist subject to a recipient lock service 718. The recipient lock service 718 keeps track of basic events (e.g., sends and notifications), when the system should interact with the consumer (e.g., next calculation time and next send time), and a synchronization state to ensure that multiple processes and systems do not interact with data structures (e.g., message queues) simultaneously.

A recipient management service 714 provides a portal to see a unified view of a specific recipient, such as the recipient preferences, system interaction schedules, accepted campaign events, and campaign send history. It also provides the ability to see aggregate views across all users.

A recipient work client 708 synchronizes access to a recipient and its events among any number of distributed agents. An agent may request a recipient account to process. The recipient work client 708 provides the next recipient account, along with essential data (such as previously scheduled campaign events). The agent performs necessary work, and completes the work. Upon completion, the recipient work client updates the recipient event heap and recipient lock service.

The recipient work client may maintain a lease on a recipient account. If an agent takes a recipient account and does not complete its work within the lease, the recipient work client invalidates the lease and allows another agent to access the account. Special care must be taken by the dispatcher to prevent multiple sends, so that agent has a different API from the Coordination Worker agent.

A campaign service 704 may provide an API that returns all eligible campaigns for a given recipient account. That is, each active campaign may have an audience criteria. For each active campaign, the campaign service applies the audience criteria to a given recipient account, and returns true if the account is eligible to participate in the campaign, and false otherwise. The campaign service 704 may return a template for each recipient. This template includes scenarios that require content. Each scenario provides recipient account specific calls to resolve content from the relevance service.

A relevance service 710 may provide content for a given user and scenario. The content may be deals, but also may be informational data, such as weather or local events.

A delivery system 722 sends content to a recipient account. The delivery system 722 includes a template rendering component that interacts with the relevance service. Due to timing issues, the results from the relevance service may change slightly between the time the coordination work calls it and the time the template rendering component calls it.

A coordination worker 702 may continually call the recipient work client 708 with a time window over which the coordination worker 702 can choose among eligible campaign events. The recipient work client 708 returns a recipient account and associated campaign event data, with a timed lease. The coordination worker must complete its processing before the lease expires. During that time, no other active element may access that recipient account. The output of a coordination worker 702 is either new campaign events or updates to existing campaign events. An update to a campaign event may be to change the send time, or to disable the event entirely.

A real time monitor 712 watches the universal clickstream for patterns that trigger a follow-up notification criteria. If such a trigger happens, the real time monitor 712 preempts the user work queue and adds an event to the heap, plus changes the next calculation time to now. That way, a coordination worker can look at the new event in a broader context. If the event passes the coordination worker, the system can operate in near real time.

A dispatcher 722 continually calls the recipient work client for campaign events that are ready to send. The recipient work client returns a recipient account and events to send immediately. The dispatcher has guaranteed send semantics, so no lease is required. Internally, the recipient work service locks a recipient account for the time it takes to insert the recipient event into the user send queue. The dispatcher 722 reads events off the user send queue, and sends the data to the delivery system 704.

Exemplary Message Queue Operations

FIG. 8 illustrates an example of a message queue 800 for transmitting messages using a message management system in accordance with some exemplary embodiments of the present invention. As described above, the use of a message queue along with mechanisms to lock and unlock access to particular users and messages allows for implementation of a message management system in a parallel manner suitable for concurrent processing. The message queue 800 illustrates processing actions 802-814 to show how the queue is processed in response to certain events and actions.

At action 802, a new recipient queue is established. The recipient queue at action 802 is empty, and the recipient status is available.

At action 804, messages are periodically received. The recipient is marked as "calculating" while messages are added to the appropriate queue. Of the four incoming messages, two are marked as "R" for rejected, and two are marked as "A" for accepted. The marker "NCT" indicates the time at which the status of the pending messages is to be updated. The user is marked as "C" for calculating while the statuses of the messages are determined.

At action 806, the system is waiting for the next action, so the user is returned to the "A" state for available. Calculating is complete, so the "NCT" marker is updated to the next calculation interval after the time interval for each of the pending messages.

At action 808, a next send time "NST" has been reached. When the current time advances to "NST", the pending messages that are marked as accepted up to the current time are sent. In the present context, that means the first message marked "A" is sent. The recipient is marked with a "sending" status while the message is sent, to ensure that no other processes can change the status of the recipient or the outgoing message while the message is sent.

At action 810, the system resumes waiting after sending the first message.

At action 812, a real-time event occurs. The real-time event may be any event that results in a new incoming event that automatically causes a recalculation. The real time event is associated with the message marked "N" for new. Upon receiving the event, a recalculation occurs immediately to determine whether to send the new message.

At action 814, the new event has been determined to be accepted, so the time of next send is updated to be the time of the new message and processing of the queue continues.

Exemplary Processes for Implementing a Message Management System

FIGS. 9-12 illustrate flow diagrams depicting processes for implementing the message management systems described above with respect to FIGS. 1-8 to control the transmission of electronic marketing communications.

FIG. 9 illustrates a flow diagram depicting an example of a process 900 for associating a message with a user message queue in accordance with some exemplary embodiments of the present invention. The process 900 illustrates how messages received by a message management system can be assigned to a message queue for a particular recipient. Once these messages are assigned to a message queue, they can be evaluated by the message management system to determine whether the messages should be authorized to be transmitted to recipients. The process 900 may be performed by message management circuitry, such as the message management circuitry 214 described above with respect to FIG. 2.

At action 902, a message is received. As described above, the message may be received from an authoring service. Upon receiving the message, the process 900 may determine a recipient for the message at action 904. At action 906, the determined recipient may be locked by the process. For example, the recipient may be locked by a recipient lock service as described above with respect to FIG. 7.

At action 908, the message is added to the message queue associated with the recipient. After adding the message to the queue at action 908, the recipient is unlocked at action 910.

FIG. 10 illustrates a flow diagram depicting an example of a process 1000 for calculating a message state for one or more messages in a recipient message queue in accordance with some exemplary embodiments of the present invention. After messages are added to a queue or other data structure associated with a recipient, the messages are periodically analyzed during a calculation process to determine whether each message should be sent. The process 1000 illustrates one example of a way to perform that calculation process. The process 1000 may be performed by message management circuitry, such as the message management circuitry 214 described above with respect to FIG. 2.

At action 1002, a recipient is selected. The selected recipient may be identified by a recipient with at least one pending message that has not yet been calculated, or the recipient may be selected by any other method (e.g., round-robin, randomly, determined based on a number of pending messages on the recipient's queue, etc.). After selecting the recipient, the recipient is locked at action 1004, such as by the recipient lock service as described above with respect to FIG. 7. At action 1006, a recipient preference model associated with the recipient is identified. As described above, the recipient preference model may indicate a set of preferences for sending communications to the recipient, such as a time, manner, cadence, and frequency with which to send communications, preferred types of communications, and the like. At action 1008, the message states (e.g., accepted, rejected, pending) are determined for one or more pending messages for the recipient based on the user preference model. During the status determination operation, all pending messages may be analyzed, or messages may be analyzed for a set period of time. For example, messages may be processed until processor resources are needed by another process, until less than a threshold number of messages remain in the message queue, or the like. At action 1010, the recipient is unlocked after determining the status of one or more of the messages on the queue based on the user preference model.

FIG. 11 illustrates a flow diagram depicting an example of a process 1100 for implementing a message preemption system in response to a preemptive event in accordance with some exemplary embodiments of the present invention. As described above, although embodiments may generally process pending messages as a queue, embodiments may also include capabilities to allow real-time events to preempt normal queue processing. The process 1100 illustrates one example of a way to perform that preemption. The process 1100 may be performed by message management circuitry, such as the message management circuitry 214 described above with respect to FIG. 2.

At action 1102, a preemptive event is received. For example, the preemptive event may include a signal (e.g., a location signal) indicating that a high priority electronic marketing communication should be sent. Whether a given message is preemptive may be determined based on a type of the message and/or one or more attributes of the message or message type. For example, some message types may be flagged or otherwise marked as "guaranteed delivery" or other properties which mark the message as eligible for consideration as a preemptive event. Message types may be defined during a registration process that determines, among other attributes, whether a specific message is preemptive. The message type may be a solicitation that gets sent to a recipient, or may be an internal trigger that informs the system to a change that may influence the messages sent. The result of this registration may be an agreement between the message management system and the registering authoring service about the message type, the message contents, and how the message should be handled (e.g., whether the message is preemptive).

It should be appreciated that, while the instant example describes a "preemptive event", the term event should be understood to describe both a particular message being received to be added to the queue (e.g., a message with a flag indicating it is preemptive) to be sent to a recipient and a trigger event (e.g., the recipient leaves an item in their cart without purchasing it, or a signal is received indicating the recipient is at a particular location) that triggers a recalculation. Although these two different types of preemptive events may trigger similar queue processing, the actual handler may be different depending upon a message type, trigger event type, or the like.

At action 1104, a recipient is selected for the event. The recipient is locked at action 1106. At action 1108, message states of messages associated with the recipient are recalculated in response to receiving the preemptive event. For example, if the preemptive event causes a new electronic marketing communication to be sent immediately, then a next event may need to be cancelled to comply with a transmission budget or other requirements for sending an electronic marketing communication. The calculation step at action 1108 thus causes an analysis of the newly received electronic marketing communication and any other pending electronic marketing communications in the queue. At action 1110, the recipient is unlocked after the pending message states are updated.

FIG. 12 illustrates a flow diagram depicting an example of a process 1200 for transmitting a message using a message management system in accordance with some exemplary embodiments of the present invention. As described above, messages may be scheduled to be transmitted at particular times as determined by recipient models created for recipients of said messages. These recipient models are utilized to determine whether a message is authorized. If a message is authorized at the scheduled time of transmission, then the message will be transmitted. The process 1200 illustrates one example process for transmitting messages in this manner. The process 1000 illustrates one example of a way to perform that calculation process. The process 1200 may be performed by message management circuitry, such as the message management circuitry 214 described above with respect to FIG. 2.

At action 1202, a recipient is selected for message transmission. As described above with respect to FIGS. 9-11, selection of a recipient may be performed based on a variety of factors. For example, selection of the recipient may be performed based on a recipient that has a next scheduled message, a recipient with a largest number of scheduled messages for transmission, or the like. At action 1204, the selected recipient is locked. At action 1206, a current time is determined. At action 1208, the current time is compared to a next scheduled transmission time for the recipient. Generally, the next transmission time is set during the calculation process to the time of the next accepted message, though some embodiments may compare the current time to the time of each pending message, rather than a separate time specifically enumerated for a next transmission time.

At action 1210, a determination is made based on the message state of the next message. If the message state is "new", the process proceeds to action 1212. If the message state is "rejected", the process proceeds to action 1214. If the message state is "accepted" the process proceeds to action 1216.

At action 1212, if the message state is new and thus has not been processed yet to determine if it is accepted, then the message may be retimed to allow time for processing. Alternatively, the message may be discarded rather than retimed, such as in the case where the message is specifically designed to be sent at a particular time.

At action 1214, if the message state is rejected, the process discards the message without transmitting it. At action 1216, if the message state is accepted, the message is transmitted to the intended recipient. The recipient is unlocked at action 1218 after processing the message.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A non-transitory computer readable storage medium comprising instructions that, when executed, configure an apparatus to:
   receive a first message from a first authoring service of the plurality of authoring services, the first message comprising at least one recipient and content for at least one electronic marketing communication, the first message comprising one of a push notification or an email and the at least one recipient comprising a consumer for which a profile is stored, the profile comprising one or more of demographics, characteristics, or preferences associated with the consumer;
   combine at least a portion of the profile with coordination service data and a set of real-time events to generate a recipient preference model for the recipient, wherein the set of real-time events comprise at least one of a current location of the recipient or a current website accessed by the recipient, and wherein the coordination service data comprises a count of messages previously transmitted to the recipient and timestamps associated with messages previously transmitted to the recipient;
   add the first message to a message queue associated with the at least one recipient;

determine a first message state for the first message in accordance with the recipient preference model;

in response to determining that the first message state indicates the first message is to be transmitted, forward the first message to message transmission circuitry;

receive a message transmission buffer status from the message transmission circuitry;

approve a plurality of messages, including the first message, for transmission to a client device associated with the recipient by the message transmission circuitry at a rate based on the message transmission buffer status; and update the recipient preference model based at least upon a determination that the first message resulted in at least one of an impression or a purchase associated with the recipient.

2. The computer readable storage medium of claim 1, wherein the instructions, when executed, further configure the apparatus to:

determine a message budget for the first authoring service;

transmit the message budget to the first authoring service;

receive the first message from the first authoring service in response to transmitting the message budget to the first authoring service, wherein the first authoring service selects the first message based at least in part on the message budget;

determine a budget value for the first message; and reduce the message budget in response to transmitting the first message.

3. The computer readable storage medium of claim 2, wherein the instructions, when executed, further configure the apparatus to: receive a registration request from the first authoring service, and determine the message budget in response to receiving the registration request.

4. The computer readable storage medium of claim 1, wherein the instructions, when executed, further configure the apparatus to:

receive a second message from a second authoring service of the plurality of authoring services, the second message comprising one of a push notification or an email;

add the second message to the message queue; and evaluate the second message using the recipient preference model to determine a second message state for the second message;

in response to determining that the second message state indicates the second message is to be discarded, remove the second message from the message queue without transmitting the second message.

5. The computer readable storage medium of claim 1, wherein the current location of the recipient or the current website accessed by the recipient is based on real-time location data received from the client device associated with the recipient.

6. The computer readable storage medium of claim 1, wherein the instructions, when executed, further configure the apparatus to:

adjust at least one variable related to the evaluation of the first message;

identify a correlation between the one or more metrics and the at least one variable; and modify a subsequent message evaluation process based at least in part on the correlation.

7. The computer readable storage medium of claim 1, wherein the instructions, when executed, further configure the apparatus to:

lock the message queue to prevent access to the message queue by another operation while during adding the first message to the message queue;

evaluate the first message; and transmit the first message to the client device associated with the recipient.

8. The computer readable storage medium of claim 1, wherein the instructions, when executed, further configure the apparatus to:

receive a plurality of messages from the plurality of authoring services;

add the plurality of messages to the message queue;

evaluate each message of the plurality of messages within the message queue; and assign a message state to each message of the plurality of messages based on evaluating the messages, wherein at least one of the message states indicates a message was accepted.

9. The computer readable storage medium of claim 8, wherein the instructions, when executed, further configure the apparatus to:

receive a preemptive message after assigning the message state to each of the plurality of messages;

based on a reevaluation of the plurality of messages in the queue and the preemptive message, alter at least one of the message states to reject the message that was accepted;

assign a state to the preemptive message indicating it is accepted; and transmit the preemptive message by the message transmission circuitry and to the client device associated with the recipient.

10. The computer readable storage medium of claim 1, wherein the program instructions configured to cause the apparatus to:

approve the plurality of messages for transmission by the message transmission circuitry at the rate based on the message transmission buffer status by:

determining a difference between an approval time at which a message is authorized and a time at which the message transmission circuitry is expected to transmit the message to the client device associated with the recipient; and designating the message as an approved message only when the difference is below a minimum threshold.

11. The computer readable storage medium of claim 10, wherein the minimum threshold is a value that is configurable.

12. An apparatus comprising at least one processor and at least one memory storing computer program code, the at least one memory and the computer program code configured to, with the processor, cause the apparatus to:

receive a first message from a first authoring service of the plurality of authoring services, the first message comprising at least one recipient and content for at least one electronic marketing communication, the first message comprising one of a push notification or an email and the at least one recipient comprising a consumer for which a profile is stored, the profile comprising one or more of demographics, characteristics, or preferences associated with the consumer;

combine at least a portion of the profile with coordination service data and a set of real-time events to generate a recipient preference model for the recipient, wherein the set of real-time events comprise at least one of a current location of the recipient or a current website accessed by the recipient, and wherein the coordination service data comprises a count of messages previously transmitted to the recipient and timestamps associated with messages previously transmitted to the recipient;

add the first message to a message queue associated with the at least one recipient;

determine a first message state for the first message in accordance with the recipient preference model;

in response to determining that the first message state indicates the first message is to be transmitted, forward the first message to message transmission circuitry;

receive a message transmission buffer status from the message transmission circuitry;

approve a plurality of messages, including the first message, for transmission to a client device associated with the recipient by the message transmission circuitry at a rate based on the message transmission buffer status; and update the recipient preference model based at least upon a determination that the first message resulted in at least one of an impression or a purchase associated with the recipient.

13. The apparatus of claim 12, wherein the at least one memory and the computer program code are further configured to, with the processor, cause the apparatus to:

determine a message budget for the first authoring service;

transmit the message budget to the first authoring service;

receive the first message from the first authoring service in response to transmitting the message budget to the first authoring service, wherein the first authoring service selects the first message based at least in part on the message budget;

determine a budget value for the first message; and reduce the message budget in response to transmitting the first message.

14. The apparatus of claim 13, wherein the at least one memory and the computer program code are further configured to, with the processor, cause the apparatus to receive a registration request from the first authoring service, and determine the message budget in response to receiving the registration request.

15. The apparatus of claim 13, wherein the at least one memory and the computer program code are further configured to, with the processor, cause the apparatus to:

receive a second message from a second authoring service of the plurality of authoring services;

add the second message to the message queue;

evaluate the second message using the one or more characteristics to determine a second message state for the second message; and in response to determining that the second message state indicates the second message is to be discarded, remove the second message from the message queue without transmitting the second message.

16. The apparatus of claim 12, wherein the current location of the recipient or the current website accessed by the recipient is based on real-time location data received from the client device associated with the recipient.

17. The apparatus of claim 12, wherein the at least one memory and the computer program code are further configured to, with the processor, cause the apparatus to:

adjust at least one variable related to the evaluation of the first message;

identify a correlation between the one or more metrics and the at least one variable; and modify a subsequent message evaluation process based at least in part on the correlation.

18. A method comprising:

receiving, from message authoring circuitry, a first message from a first authoring service of the plurality of authoring services, the first message comprising at least one recipient and content for at least one electronic marketing communication, the first message comprising one of a push notification or an email and the at least one recipient comprising a consumer for which a profile is stored, the profile comprising one or more of demographics, characteristics, or preferences associated with the consumer;

combining at least a portion of the profile with coordination service data and a set of real-time events to generate a recipient preference model for the recipient, wherein the set of real-time events comprise at least one of a current location of the recipient or a current web site accessed by the recipient, and wherein the coordination service data comprises a count of messages previously transmitted to the recipient and timestamps associated with messages previously transmitted to the recipient;

adding the first message to a message queue associated with the at least one recipient;

determine a first message state for the first message in accordance with the recipient preference model; and in response to determining that the first message state indicates the first message is to be transmitted, forwarding the first message to message transmission circuitry;

receiving a message transmission buffer status from the message transmission circuitry;

approving a plurality of messages, including the first message, for transmission to a client device associated with the recipient by the message transmission circuitry at a rate based on the message transmission buffer status; and updating the recipient preference model based at least upon a determination that the first message resulted in at least one of an impression or a purchase associated with the recipient.

* * * * *